United States Patent … US 10,278,150 B2
Abraham et al. (45) Date of Patent: Apr. 30, 2019

(54) NEIGHBOR AWARE NETWORK CLUSTER CHANGE FOR NEIGHBOR AWARE NETWORK DATA LINK

(71) Applicant: QUALCOMM Incorporated, San Diego, CA (US)

(72) Inventors: Santosh Paul Abraham, San Diego, CA (US); Alireza Raissinia, Monte Sereno, CA (US); Abhishek Pramod Patil, San Diego, CA (US); George Cherian, San Diego, CA (US); Shivraj Singh Sandhu, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/802,647

(22) Filed: Nov. 3, 2017

(65) Prior Publication Data

US 2018/0054789 A1 Feb. 22, 2018

Related U.S. Application Data

(62) Division of application No. 15/266,768, filed on Sep. 15, 2016.
(Continued)

(51) Int. Cl.
*H04W 56/00* (2009.01)
*H04W 40/24* (2009.01)
(Continued)

(52) U.S. Cl.
CPC ........... *H04W 56/004* (2013.01); *H04L 43/16* (2013.01); *H04W 40/244* (2013.01);
(Continued)

(58) Field of Classification Search
CPC ........... H04W 56/004; H04W 56/0015; H04W 40/244; H04W 88/12; H04W 72/06;
(Continued)

(56) References Cited

U.S. PATENT DOCUMENTS

2015/0036540 A1  2/2015  Kasslin et al.
2015/0098388 A1  4/2015  Fang et al.
(Continued)

FOREIGN PATENT DOCUMENTS

CN   103118406 A   5/2013
CN   104349285 A   2/2015
(Continued)

OTHER PUBLICATIONS

Camps-Mur D., et al., "Enabling always on service discovery: Wifi neighbor awareness networking", IEEE Wireless Communications, IEEE Service Center, Piscataway, NJ, US, vol. 22, No. 2, Apr. 1, 2015, pp. 118-125, XP011579866.
(Continued)

*Primary Examiner* — Wayne H Cai
(74) *Attorney, Agent, or Firm* — Patterson & Sheridan, L.L.P.

(57) ABSTRACT

Aspects of the present disclosure provide techniques for synchronizing clocks in a Neighbor Aware Network (NAN) Data Link (NDL) cluster. An exemplary apparatus includes a processing system configured to communicate with one or more members of a group, that includes the apparatus, according to a first data communication window (DCW) timeline having a first offset relative to a first clock associated with a first network cluster, to detect a beacon transmitted by a device of a second network cluster, wherein the beacon comprises timing information of a second clock associated with the second network cluster, to determine whether to initiate a move of the group to the second
(Continued)

network cluster, to generate a frame to initiate the move of the group to the second network cluster, the frame comprising a first indication of the timing information of the second clock, and an interface configured to output the frame for transmission.

13 Claims, 16 Drawing Sheets

Related U.S. Application Data

(60) Provisional application No. 62/221,597, filed on Sep. 21, 2015.

(51) Int. Cl.
    *H04W 72/06*     (2009.01)
    *H04L 12/26*     (2006.01)
    *H04W 48/00*     (2009.01)
    *H04W 84/18*     (2009.01)
    *H04W 88/12*     (2009.01)
    *H04W 84/20*     (2009.01)
    *H04W 8/00*     (2009.01)

(52) U.S. Cl.
    CPC ....... *H04W 48/00* (2013.01); *H04W 56/0015* (2013.01); *H04W 72/06* (2013.01); *H04W 84/18* (2013.01); *H04W 8/005* (2013.01); *H04W 84/20* (2013.01); *H04W 88/12* (2013.01)

(58) Field of Classification Search
    CPC ..... H04W 8/005; H04W 84/20; H04W 84/18; H04W 48/00; H04L 43/16
    See application file for complete search history.

(56) References Cited

U.S. PATENT DOCUMENTS

| | | |
|---|---|---|
| 2015/0109981 A1 | 4/2015 | Patil et al. |
| 2015/0131529 A1 | 5/2015 | Zhou et al. |
| 2015/0200811 A1 | 7/2015 | Kasslin et al. |
| 2016/0212606 A1 | 7/2016 | Qi et al. |
| 2017/0086157 A1 | 3/2017 | Abraham et al. |

FOREIGN PATENT DOCUMENTS

| | | |
|---|---|---|
| CN | 104378800 A | 2/2015 |
| EP | 2958371 A1 | 12/2015 |
| WO | 2014139413 A1 | 9/2014 |

OTHER PUBLICATIONS

International Search Report and Written Opinion—PCT/US2016/052234—ISA/EPO—dated Jan. 3, 2017.
Taiwan Search Report—TW105130170—TIPO—dated Dec. 10, 2018.

NEIGHBOR AWARE NETWORK CLUSTER CHANGE FOR NEIGHBOR AWARE NETWORK DATA LINK

CROSS-REFERENCE TO RELATED APPLICATIONS

This application is a divisional application of U.S. patent application Ser. No. 15/266,768 entitled "NEIGHBOR AWARE NETWORK CLUSTER CHANGE FOR NEIGHBOR AWARE NETWORK DATA LINK", filed Sep. 15, 2016, which claims benefit of U.S. Provisional Application No. 62/221,597, filed Sep. 21, 2015, each of which is assigned to the assignee of the present application and hereby expressly incorporated by reference herein in its entirety.

BACKGROUND

Field of the Disclosure

Certain aspects of the present disclosure generally relate to wireless communications and, more particularly, to time synchronization of data links in neighbor aware networks.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than wireless ranges associated with frequency ranges of other IEEE 802.11 technologies and potentially fewer issues associated with path losses due to obstructions.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Aspects of the present disclosure generally relate to wireless communications and, more particularly, time synchronization of data links in neighbor aware networks (NANs).

Aspects of the present disclosure provide an apparatus for wireless communications. The apparatus generally includes a processing system configured to communicate with one or more members of a group, that includes the apparatus, according to a first data communication window (DCW) timeline having a first offset relative to a first clock associated with a first network cluster, to detect a beacon transmitted by a device of a second network cluster, wherein the beacon comprises timing information of a second clock associated with the second network cluster, to determine whether to initiate a move of the group to the second network cluster, to generate a frame to initiate the move of the group to the second network cluster, if the determination is to initiate the move, the frame comprising the timing information of the second clock, and an interface configured to output the frame for transmission.

Aspects of the present disclosure provide a method for wireless communications performed by an apparatus. The method generally includes communicating with members of a group, that includes the apparatus, according to a first data communication window (DCW) timeline having a first offset relative to a first clock associated with a first network cluster, detecting a beacon transmitted by a device of a second network cluster, wherein the beacon comprises timing information of a second clock associated with the second network cluster, determining whether to initiate a move of the group to the second network cluster, generating a frame to initiate the move of the group to the second network cluster, if the determination is to initiate the move, the frame comprising a first indication of the timing information of the second clock, and transmitting the frame.

Aspects of the present disclosure provide an apparatus for wireless communications. The apparatus generally includes means for communicating with members of a group, that includes the apparatus, according to a first data communication window (DCW) timeline having a first offset relative to a first clock associated with a first network cluster, means for detecting a beacon transmitted by a device of a second network cluster, wherein the beacon comprises timing information of a second clock associated with the second network cluster, means for determining whether to initiate a move of the group to the second network cluster, means for generating a frame to initiate the move of the group to the second network cluster, if the determination is to initiate the move, the frame comprising a first indication of the timing information of the second clock, and means for transmitting the frame.

Aspects of the present disclosure provide a computer program product. The computer program product generally includes a computer readable medium storing instructions, the instructions when executed by a processing system cause an apparatus to communicate with members of a group according to a first data communication window (DCW) timeline having a first offset relative to a first clock associated with a first network cluster, detect a beacon transmitted by a device of a second network cluster, wherein the beacon comprises timing information of a second clock associated with the second network cluster, determine whether to initiate a move of the group to the second network cluster, generate a frame to initiate the move of the group to the second network cluster, if the determination is to initiate the move, the frame comprising a first indication of the timing information of the second clock, and transmit the frame.

Aspects of the present disclosure provide a station. The station generally includes at least one antenna, a transceiver, and a processing system configured to communicate, via the transceiver and the at least one antenna, with members of a group, that includes the station, according to a first data communication window (DCW) timeline having a first offset relative to a first clock associated with a first network cluster, to detect, via the transceiver and the at least one antenna, a beacon associated with a second network cluster, wherein the beacon comprises timing information of a second clock associated with the second network cluster, to determine whether to initiate a move of the group to the second network cluster, to generate a frame to initiate the move of the group to the second network cluster, if the determination is to initiate the move, the frame comprising a first indication of the timing information of the second clock, and to transmit the frame via the transceiver and the at least one antenna.

Aspects of the present disclosure provide an apparatus for wireless communications. The apparatus generally includes a receive interface configured to obtain a first frame announcing a move of a group of devices that includes the apparatus as a member, from a first network cluster to a second network cluster, wherein the first frame comprises timing information of a clock associated with the second network cluster and a processing system configured to determine, based on the timing information, a data communication window (DCW) timeline for the apparatus to communicate data with one or more members of the group after the move, and to communicate with the one or more members of the group after the move according to the DCW timeline.

Aspects of the present disclosure provide a method for wireless communications performed by an apparatus. The method generally includes obtaining a first frame announcing a move of a group of devices that includes the apparatus as a member, from a first network cluster to a second network cluster, wherein the first frame comprises timing information of a clock associated with the second network cluster, determining, based on the timing information, a data communication window (DCW) timeline for the apparatus to communicate data with one or more members of the group after the move, and communicating with the one or more members of the group after the move according to the DCW timeline.

Aspects of the present disclosure provide an apparatus for wireless communications. The apparatus generally includes means for obtaining a first frame announcing a move of a group of devices that includes the apparatus as a member, from a first network cluster to a second network cluster, wherein the first frame comprises timing information of a clock associated with the second network cluster, means for determining, based on the timing information, a data communication window (DCW) timeline for the apparatus to communicate data with one or more members of the group after the move, and means for communicating with the one or more members of the group after the move according to the DCW timeline.

Aspects of the present disclosure provide a computer readable medium storing instructions, the instructions when executed by a processing system cause an apparatus to obtain a first frame announcing a move of a group of devices that includes the apparatus as a member, from a first network cluster to a second network cluster, wherein the first frame comprises timing information of a clock associated with the second network cluster, to determine, based on the timing information, a data communication window (DCW) timeline for the apparatus to communicate data with one or more members of the group after the move, and to communicate with the one or more members of the group after the move according to the DCW timeline.

Aspects of the present disclosure provide a station. The station generally includes at least one antenna, a transceiver, and a processing system configured to obtain, via the transceiver and the at least one antenna, a first frame announcing a move of a group of devices that includes the apparatus as a member, from a first network cluster to a second network cluster, wherein the first frame comprises timing information of a clock associated with the second network cluster, to determine, based on the timing information, a data communication window (DCW) timeline for the apparatus to communicate data with one or more members of the group after the move, and to communicate, via the transceiver and the at least one antenna, with the one or more members of the group after the move according to the DCW timeline.

Aspects of the present disclosure provide an apparatus for wireless communications. The apparatus generally includes a receive interface configured to obtain a first frame announcing a move of a group of devices that includes the apparatus as a member, from a first network cluster to a second network cluster, wherein the first frame comprises timing information of a clock associated with the second network cluster and a processing system configured to determine, based on at least one of services available in the first network cluster or activity of a data link, to veto the move and to generate a second frame indicating that the apparatus vetoes the move, and a transmit interface configured to output the second frame for transmission to the first device.

Aspects of the present disclosure provide a method for wireless communications performed by an apparatus. The method generally includes obtaining a first frame announcing a move of a group of devices that includes the apparatus as a member, from a first network cluster to a second network cluster, wherein the first frame comprises timing information of a clock associated with the second network cluster, determining, based on at least one of services available in the first network cluster or activity of a data link, to veto the move, generating a second frame indicating that the apparatus vetoes the move, and transmitting the second frame to the first device.

Aspects of the present disclosure provide an apparatus for wireless communications. The apparatus generally includes means for obtaining a first frame announcing a move of a group of devices that includes the apparatus as a member, from a first network cluster to a second network cluster, wherein the first frame comprises timing information of a clock associated with the second network cluster, means for determining, based on at least one of services available in the first network cluster or activity of a data link, to veto the move, means for generating a second frame indicating that the apparatus vetoes the move, and means for transmitting the second frame to the first device.

Aspects of the present disclosure provide a computer readable medium storing instructions, the instructions when executed by a processing system cause an apparatus to obtain a first frame announcing a move of a group of devices that includes the apparatus as a member, from a first network cluster to a second network cluster, wherein the first frame comprises timing information of a clock associated with the second network cluster, to determine, based on at least one of services available in the first network cluster or activity of a data link, to veto the move, to generate a second frame indicating that the apparatus vetoes the move, and to transmit the second frame to the first device.

Aspects of the present disclosure provide a station. The station generally includes at least one antenna, a transceiver, and a processing system configured to obtain, via the transceiver and the at least one antenna, a first frame announcing a move of a group of devices that includes the apparatus as a member, from a first network cluster to a second network cluster, wherein the first frame comprises timing information of a clock associated with the second network cluster, to determine, based on at least one of services available in the first network cluster or activity of a data link, to veto the move, to generate a second frame indicating that the apparatus vetoes the move, and to communicate, via the transceiver and the at least one antenna, with the one or more members of the group after the move according to the DCW timeline.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
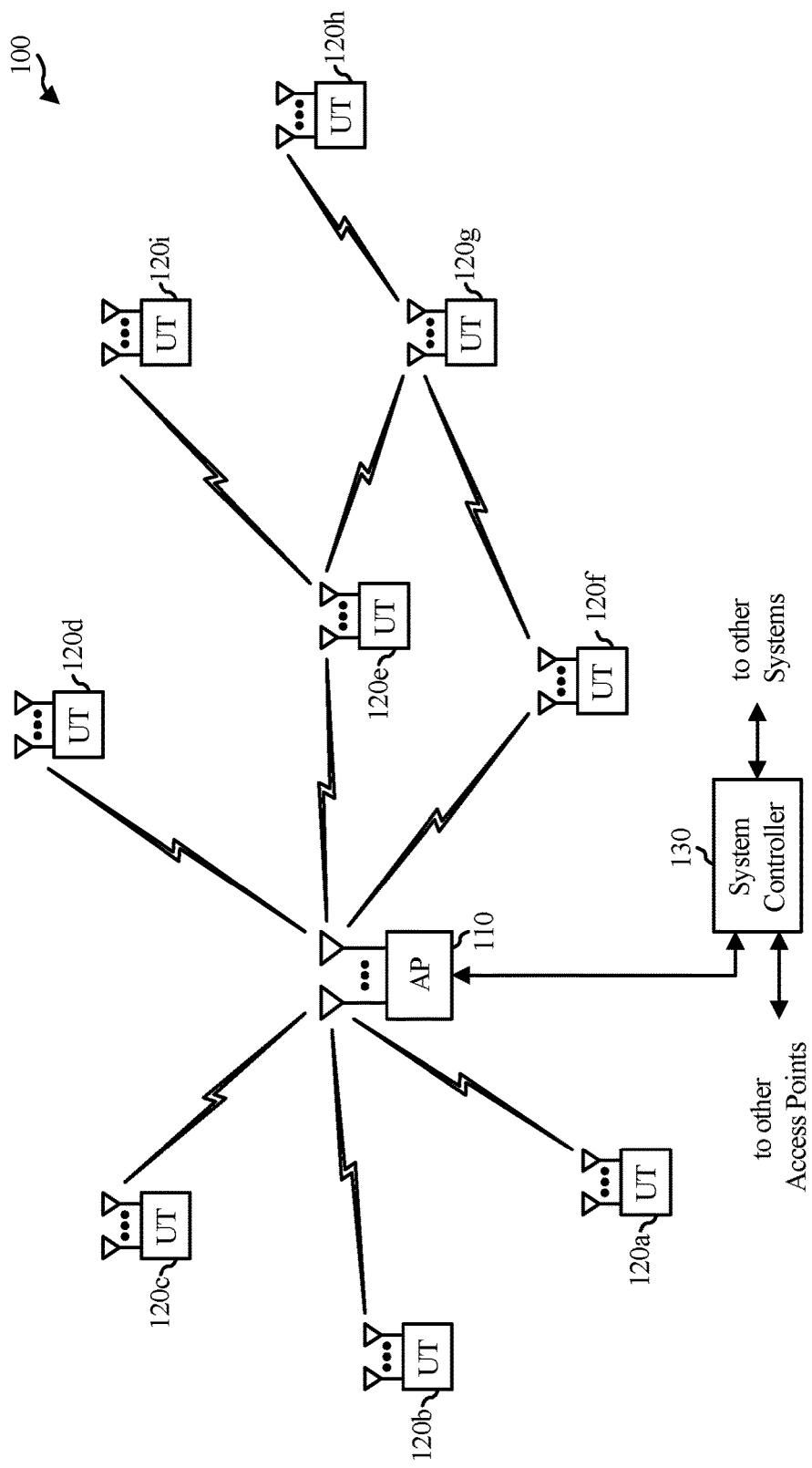
FIG. 1 illustrates a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure generally relate to wireless communications and, more particularly, numerology and frames for neighbor aware networks (NAN) in the sub-1 GHz (S1G) band. As will be described in more detail herein, different types of discovery windows (DWs) of different durations and at different intervals may be defined. A NAN device (e.g., access point (AP) or non-AP station in the NAN) may wake up during one or more types of discovery windows to transmit time synchronization information and/or service discovery information.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA" such as an "AP STA" acting as an AP or a "non-AP STA") or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communications System

FIG. 1 illustrates a system 100 in which aspects of the disclosure may be performed. For example, any of the wireless stations including the access point 110 and/or the user terminals 120 may be in a neighbor aware network (NAN). A wireless station may wake up during a first type of discovery window having a first duration and occurring at a first interval and send and/or monitor for time synchronization information or service information.

A wireless station may wake up during one or more types of discovery windows to transmit time synchronization information and/or service discovery information. Different types of discovery windows of different durations and at different intervals may be defined.

The system 100 may be, for example, a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
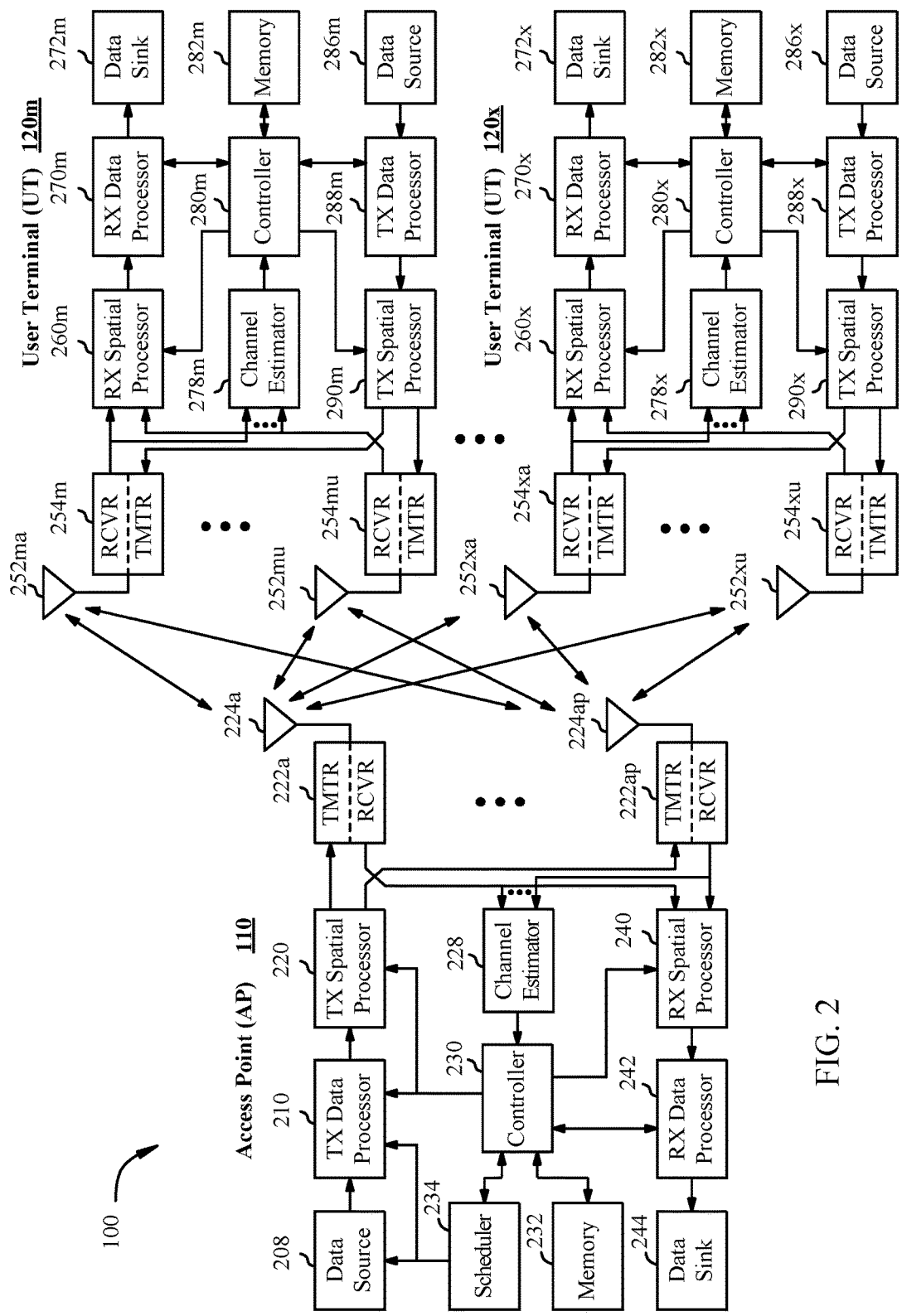
FIG. 2 illustrates a block diagram of an example access point and user terminals, in accordance with certain aspects of the present disclosure.

FIG. 2 illustrates example components of the AP 110 and two UTs 120m and 120x, which are examples of the UTs 120 operating in the MIMO system 100 illustrated in FIG. 1. One or more components of the AP 110 and UT 120 may be used to practice aspects of the present disclosure. For example, antenna 224, Tx/Rx 222, processors 210, 220, 240, 242, and/or controller 230 or antenna 252, Tx/Rx 254, processors 260, 270, 288, and 290, and/or controller 280 may be used to perform the operations described herein and illustrated with reference to FIGS. 10 and 10.

The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals. The decoded data for each user terminal may be provided to a data sink 272 for storage and/or a controller 280 for further processing.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
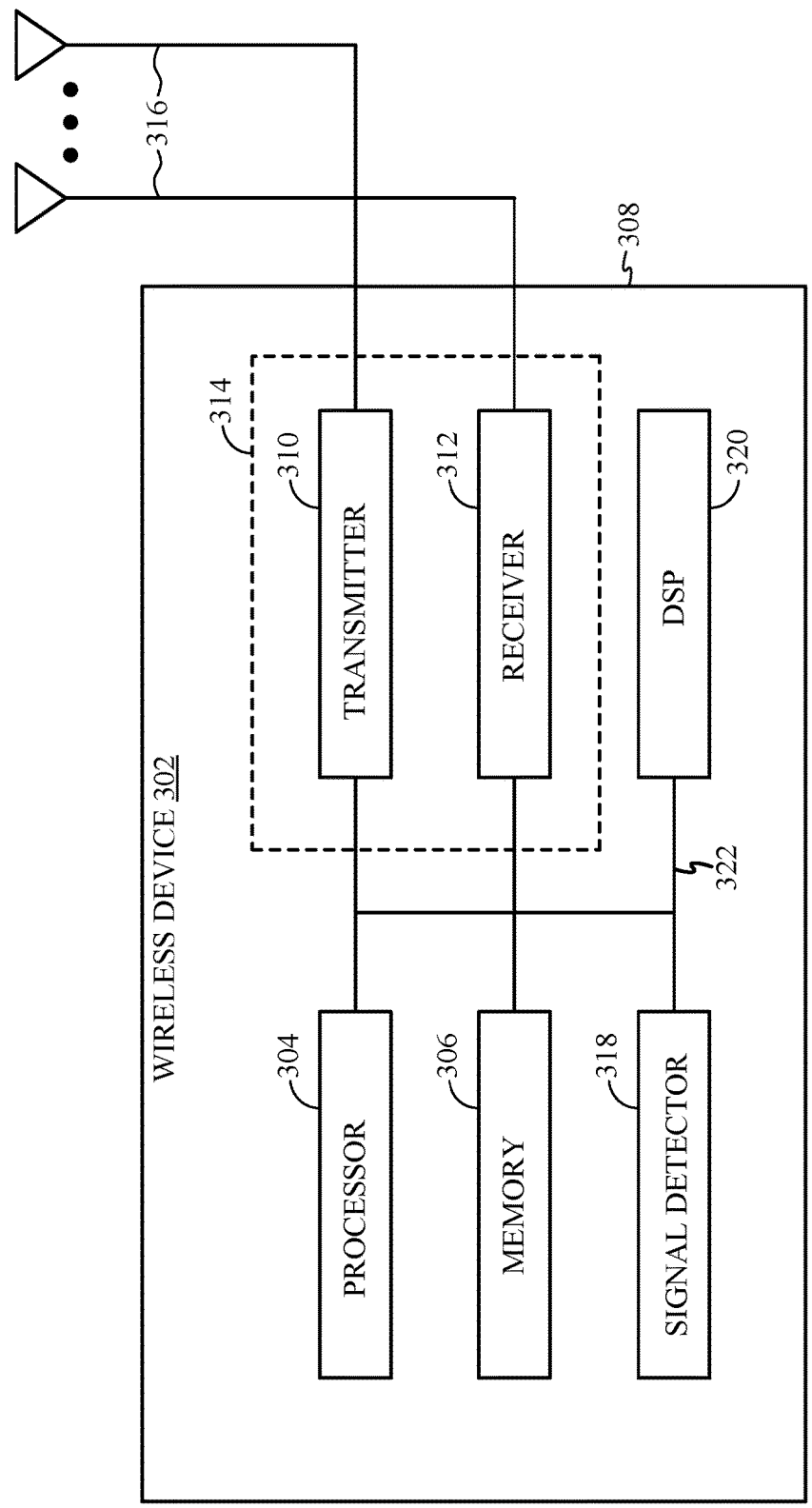
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 1000 and 1100 illustrated in FIGS. 9 and 11. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Neighbor Aware Network

Due to the increasing popularity of location-enabled (e.g., GPS-enabled) mobile devices, neighbor aware networks (NANs) are emerging. A NAN may refer to a network for communication between stations (STAs) that are located in close proximity to each other. Neighbor aware networking (NAN) provides a mechanism for devices to synchronize the time and channel on which the devices converge to facilitate the discovery of services that have been made discoverable on the existing devices in a NAN or new devices that enter the environment.

A WiFi capable (i.e., capable of communicating according to one or more IEEE 802.11 standards) device that supports NAN protocols and that may be a NAN Master or a NAN non-Master may be referred to as a NAN device.

A NAN discovery window may refer to the time and channel on which NAN devices converge. That is, devices in a NAN may converge on a set of time and frequency resources for exchanging (e.g., transmitting, receiving) information regarding the NAN, referred to as a NAN discovery window. A collection of NAN devices that are synchronized to a same discovery window schedule may be referred to as a NAN cluster.

Figure 4:
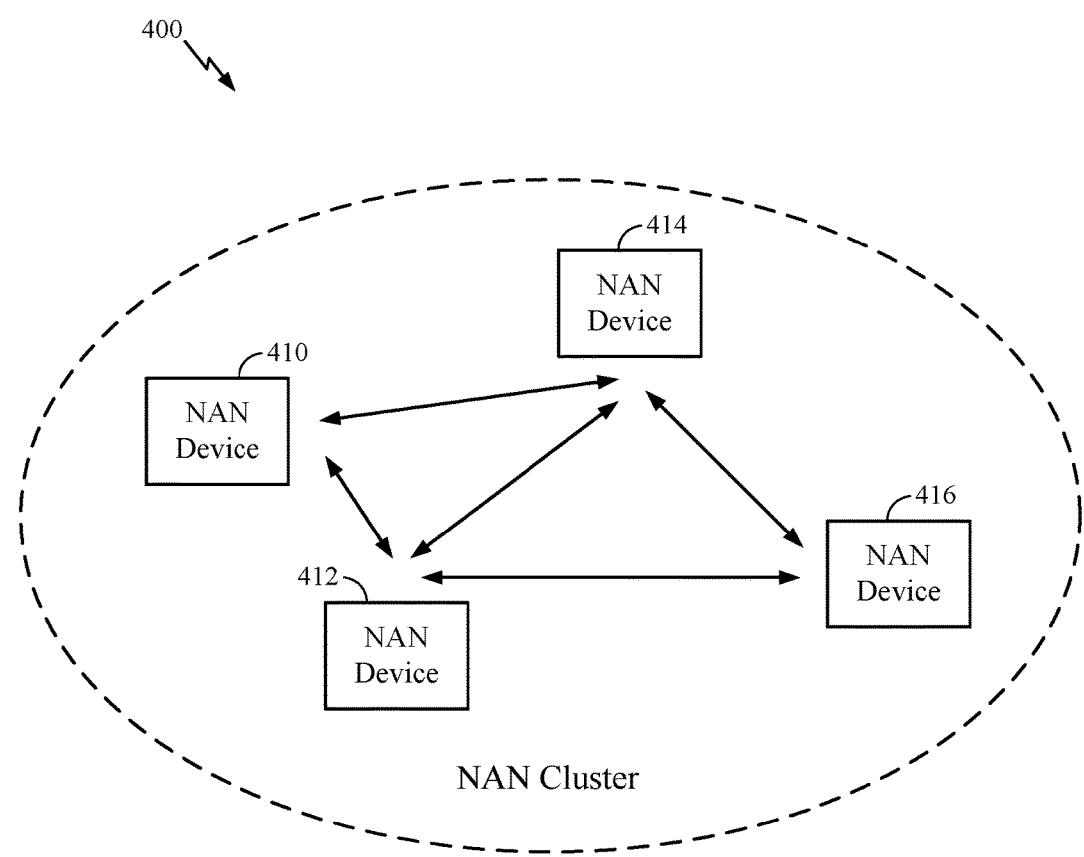
FIG. 4 illustrates an example NAN cluster, in accordance with certain aspects of the present disclosure.

FIG. 4 illustrates an example NAN cluster 400, in accordance with certain aspects of the present disclosure. NAN Devices (e.g., such as AP 110 or user terminal 120) 410, 412, 414, 416 that are part of the same NAN Cluster participate in a NAN Master Selection procedure. Depending on changes in the NAN Cluster, such as NAN Devices becoming part of or leaving the NAN Cluster and Master Ranks of those NAN devices, different NAN Devices may be elected to become NAN Devices in Master role for the NAN cluster at different times.

A NAN ID may be used to signify a set of NAN parameters (e.g., discovery channels, discover window times). A NAN network may refer to a collection of NAN clusters that share a same NAN ID.

Figure 5:
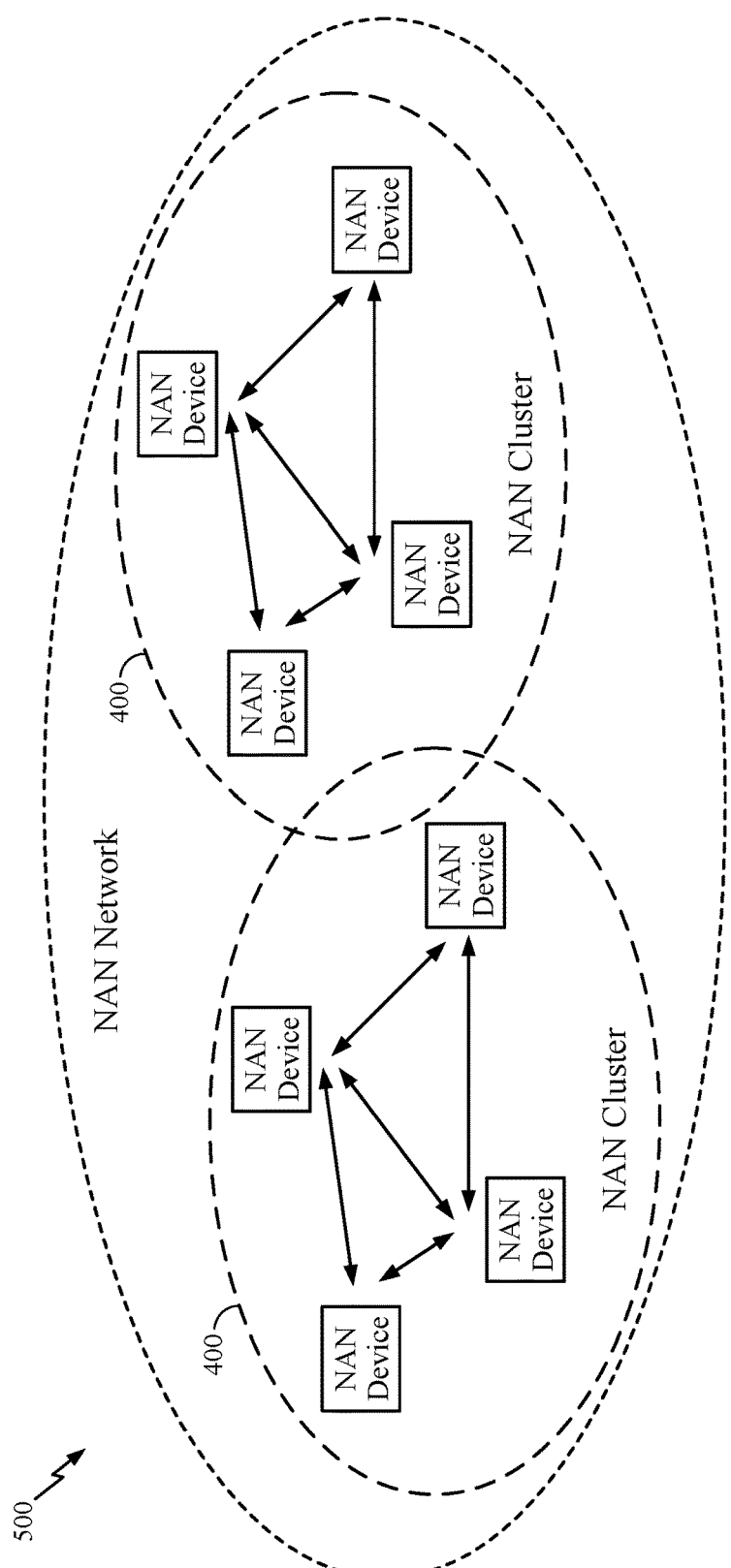
FIG. 5 illustrates an example NAN network with overlapping NAN clusters, in accordance with certain aspects of the present disclosure.

FIG. 5 illustrates an example NAN network 500 with overlapping NAN clusters 502, 504, in accordance with certain aspects of the present disclosure. Although not shown in FIG. 5, a NAN device may participate in more than one overlapping cluster. Also not shown, a NAN device may operate concurrently in a NAN network with other types of WiFi networks (e.g., STAs in different homes or buildings as pan of independent LANs with different external network connections), such as a wireless local area network (WLAN) or WiFi Direct.

NANs generally utilize a discovery window to advertise the existence of devices, services offered by the NAN, and synchronization information. During the discovery window, NAN Devices of the NAN are available (e.g., the NAN devices power on receiver components to listen for transmissions and make themselves available) with high probability for mutual discovery. During interim periods, the devices may be asleep (e.g., in a low power mode with one or more receiver components powered down) or involved with other activities, for example, communicating on other networks and/or a different channel. A NAN device that creates the NAN cluster may define a series of discovery window start times (DWSTs) for discovery windows of the NAN cluster, described below.

NAN Devices participating in the same NAN Cluster are synchronized to a common clock. During a discovery window, one or more NAN Devices transmit NAN Synchronization Beacon frames (also referred to as NAN beacon frames and NAN beacons) to help all NAN Devices within the NAN Cluster synchronize their clocks. A timing synchronization function (TSF) keeps the timers of all NAN Devices in the same NAN Cluster synchronized. The TSF in a NAN Cluster may be implemented via a distributed algorithm, and NAN beacon frames can be transmitted (e.g., by one or more NAN devices in the cluster) according to the algorithm described. A relative starting point or "time zero" may be defined as the first DWST. According to certain aspects, all devices in the NAN may wake up at the first discovery window (DW0), which may be defined, for example, as the discovery window in which the lower 23 bits of a value of the TSF are zero. During subsequent discovery windows, certain NAN devices may choose to be awake (e.g., wake up if in a power save mode) or not be awake (e.g., enter or remain in a power save mode). Synchronization may decrease the discovery latency of devices, power consumption by devices, and medium occupancy by devices that would otherwise occur.

The NAN synchronization procedure is separate from service discovery messaging. Although a NAN Device transmits not more than one Synchronization Beacon in a discovery window, multiple NAN Service Discovery frames may be transmitted by a NAN Device in a discovery window. NAN Service Discovery frames make services discoverable by other NAN Devices, possibly enabling NAN Devices to look for services from other NAN Devices.

Each device within a NAN may have an anchor master rank. The anchor master rank may indicate, for example, the relative accuracy of a clock associated with the device. Devices within a NAN may synchronize clocks with the device in the NAN having a highest anchor master rank (e.g., the device indicated as having the most accurate clock).

Figure 6:
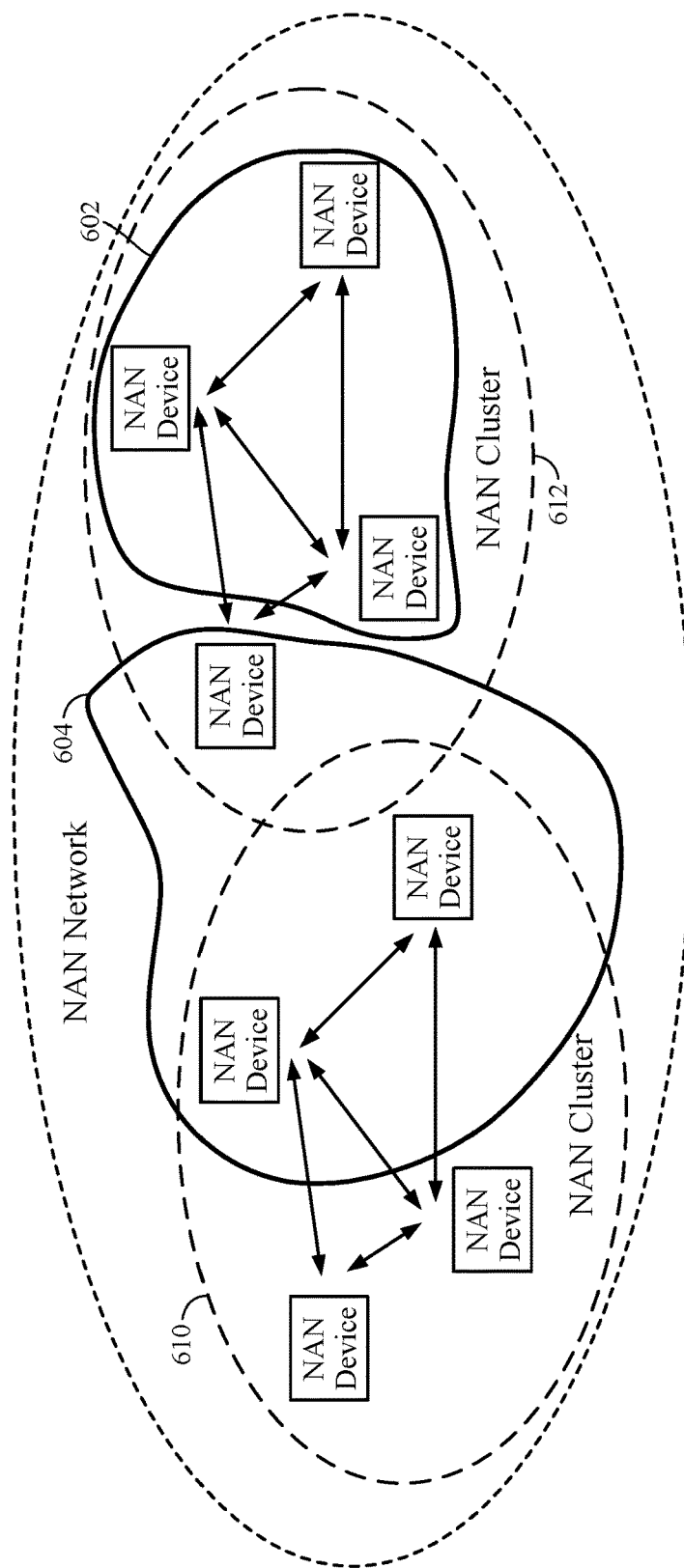
FIG. 6 illustrates an example NAN network with a plurality of NAN Data Link (NDL) clusters, in accordance with certain aspects of the present disclosure.

In some cases, as illustrated in FIG. 6, a NAN data link (NDL) cluster 602, 604 may be formed from a plurality of devices that are members of at least one NAN cluster 610, 612. An NDL cluster may comprise members of a single NAN cluster, as illustrated by NDL cluster 602, or members of multiple NAN clusters, as illustrated by NDL cluster 604. A member of an NDL cluster may perform data communications within the NDL cluster, but not necessarily with other members of the NAN to which the member belongs. Devices within an NDL cluster may perform communications within the NDL cluster outside of a NAN discovery window and not concurrently with transmissions within the NAN.

Figure 7:
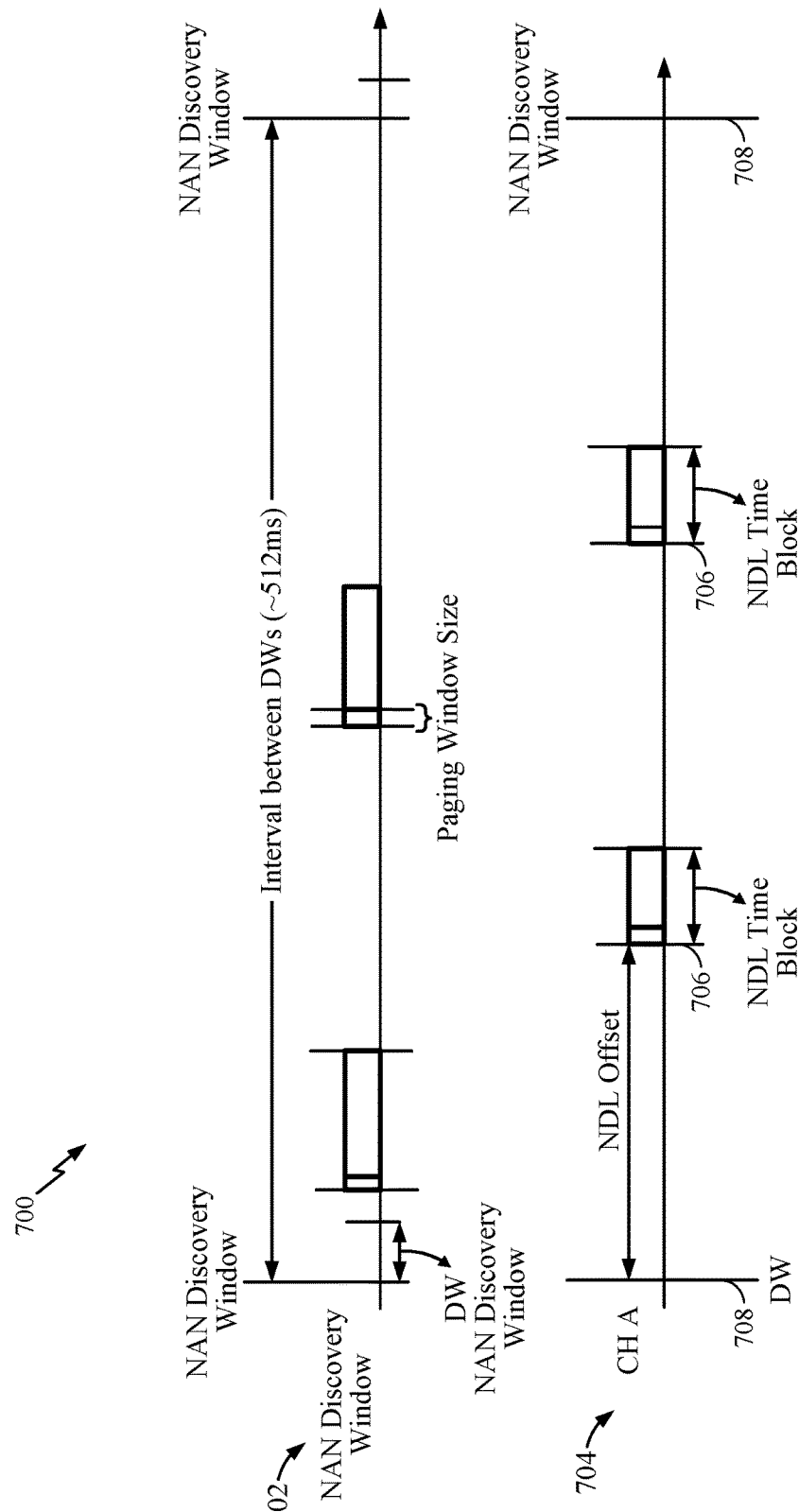
FIG. 7 is an example time sequence diagram illustrating an example timeline of NAN discovery window periods and NDL time blocks, in accordance with certain aspects of the present disclosure.

FIG. 7 illustrates an example timeline 700 of communications within a NAN cluster and an NDL cluster. As illustrated, on the NAN discovery channel 702, DWSTs 708 have an interval of 512 time units (TUs) (i.e., the beginning of a discovery window is 512 TUs after the beginning of a previous discovery window). NDL Time Blocks 706, in which communications such as those shown on channel A 704 may be performed within the NDL cluster, may be offset in time from the DWST. In some cases, NDL Time Block times may be set at fixed offsets, relative to the discovery window timeline. That is, each NDL Time Block time may begin a fixed offset from a corresponding DWST. NDL Time Block times may occur according to an NDL base schedule. Devices within an NDL cluster may receive information regarding the NDL base schedule from other devices within the NDL cluster, and may negotiate the NDL base schedule with the other devices.

When a NAN Data Link (NDL) cluster is initialized, an NDL timeline may be determined based on the discovery window timeline of the originating cluster (e.g., the originating NAN cluster). Once the NDL cluster is initialized, the NDL cluster may maintain a timeline that is independent of a discovery window timeline. The NDL timeline may not shift, even as the originating NAN cluster changes. If all devices in the NDL cluster are members of the same NAN cluster, the NDL clock may be synchronized with the NAN clock.

In a dynamic environment, changes in a NAN cluster with which a member of an NDL cluster is associated may in turn cause a shift in a discovery window timeline of the NAN cluster. If, for example, NDL Time Block times are set as a fixed offset from DWSTs as mentioned above, the NDL may fail due to cluster timing changes causing different devices in the NDL cluster to calculate different NDL Time Block times. Since the devices in the NDL cluster may calculate different NDL Time Block times, data transmission in the NDL may be misaligned, causing data communication failures between some devices in the NDL cluster. Thus, techniques for synchronizing timing within an NDL cluster may be desirable.

Example Neighbor Aware Network Cluster Change for Neighbor Aware Network Data Link According to certain aspects of the present disclosure, for NAN Data Link (NDL) clusters, an NDL timeline may be determined based on a discovery window timeline of an originating NAN cluster. That is, devices in a NAN cluster may form an NDL cluster with an NDL timeline based on the discovery window timeline of the NAN cluster. As described above, when a device that is a member of an NDL detects another NAN cluster and determines to join the other NAN cluster, the NDL may fail due to changes in cluster timing caused by the device joining the other NAN cluster. The device may determine to join the other NAN cluster based on an anchor master rank of an anchor master of the other cluster, how many times and how often the device has detected the other cluster, and/or services offered in the other cluster.

A device that is a member of an NDL and determines to join a new NAN cluster may communicate information regarding the new NAN cluster to another member (e.g., another device) of the NDL so that the two devices may move to the new NAN cluster (e.g., port the NDL to a new timeline that is based on timing information, such as a time synchronization function (TSF), of the new NAN cluster). The two devices may continue to communicate via the NDL after moving to the new timeline.

Figure 8:
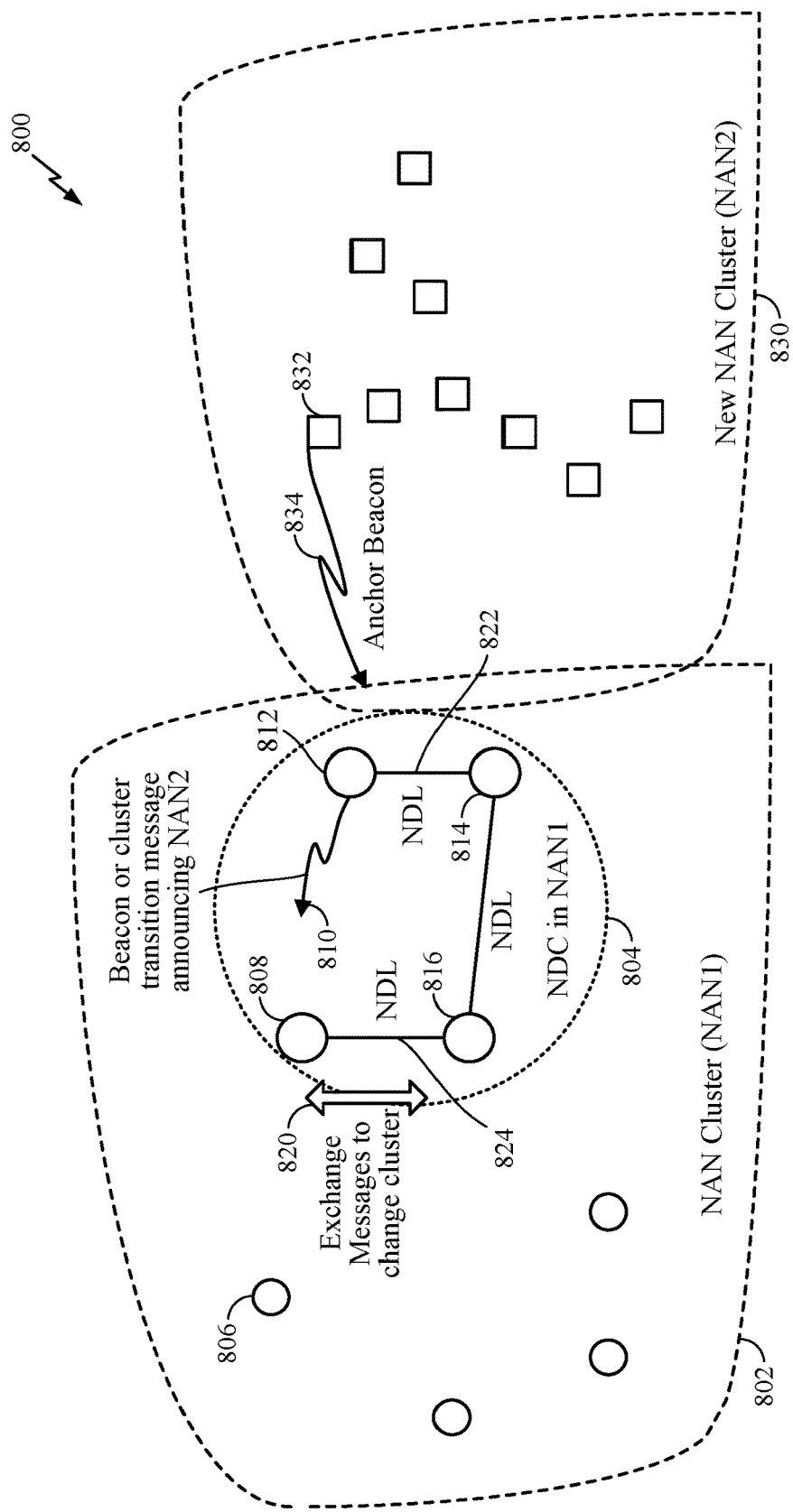
FIG. 8 illustrates an exemplary NAN network, according to aspects of the present disclosure.

FIG. 8 illustrates an exemplary NAN network 800 in which aspects of the present disclosure may be practiced. There are two NAN clusters 802, 830, referred to as NAN1 and NAN2. In the exemplary NAN network, NAN cluster 802 originally includes the nodes represented as circles, while NAN cluster 830 originally includes the nodes represented as squares. Nodes (e.g., stations) 808, 812, 814, and 816 have formed a NAN data link cluster 804 within NAN cluster 802 (NAN1). While the NAN data link cluster is shown with four nodes, aspects of the present disclosure may be practiced in NAN data link clusters with more or fewer nodes. As illustrated, the NAN cluster 802 has an anchor master node 806 that is not a member of the NAN data link cluster 804 with 808, 812, 814, and 816. Also as illustrated, the NAN cluster 802 may also have a number of other nodes, although aspects of the present disclosure may be practiced without the other nodes. The second NAN cluster 830 has an anchor master node 832.

According to aspects of the present disclosure, a first node, e.g. node 812, may be a member of a first NAN cluster (e.g., NAN1 802) and may have one or more NDLs with other nodes (e.g., nodes 808, 814, 816), forming a NAN data link cluster (NDC), e.g., NDC 804. The first node may detect an anchor beacon from a second NAN cluster (e.g., NAN 830). The first node may determine to join the second NAN cluster based on an anchor master rank of an anchor master of the second NAN cluster, how many times and how often the device has detected the second NAN cluster, and/or services offered in the second NAN cluster. For example, if the anchor master rank of the anchor master node 832 is higher than an anchor master rank of anchor master node 806, then node 812 may determine to join the second NAN cluster. In a second example, the node 812 may detect the anchor beacon 834 a first time and determine not to join the second NAN cluster, as the second NAN cluster may be a passing NAN cluster. Continuing the second example, the node 812 may detect a second anchor beacon from anchor master node 832 at a later time and determine to join the second NAN cluster, as the second NAN cluster does not appear to be passing by. In a third example, the node 812 may detect the anchor beacon 834, determine that a desired service (e.g., a game service) is offered in the second NAN cluster, and determine to join the second NAN cluster, because the desired service is offered in the second NAN cluster.

Upon determining to join the second NAN cluster, the first node may transmit a beacon or cluster transition message 810, in the NAN data link base schedule of the NAN data link cluster, announcing the second NAN cluster to one or more other nodes, e.g., nodes that are in the NAN data link cluster with the first node (e.g., nodes 808, 814, 816). The first node may negotiate, with other nodes receiving the beacon or cluster transition message, times to transition NDLs between each pair of nodes to port the NDLs to a new timeline based on timing information (e.g., a TSF) of the second NAN cluster. A node (e.g., node 808) receiving a beacon or cluster transition message announcing another NAN cluster may also transmit a message announcing the other NAN cluster to other nodes and negotiate one or more times to transition each NDL between the node transmitting the message and each receiving node. For example and with reference to FIG. 8, node 812 is a member of NAN 802 when node 812 detects an anchor beacon 834 from the anchor master 832 of NAN 830. In the example, node 812 determines to transition to NAN 830 and sends a cluster transition message or beacon 810, in the NAN data link base schedule of NDC 804, announcing that node 812 will transition to NAN 830. Still in the example, node 812 and node 814 negotiate a time to transition the NDL 822 between node 812 and node 814 to use timing information from NAN 830. Also in the example, node 808 receives the message announcing the transition of node 812 to NAN 830, and node 808 negotiates with node 816, via one or more messages 820, to determine a time to transition the NDL 824 between node 808 and node 816 to use timing information from NAN 830.

Figure 9:
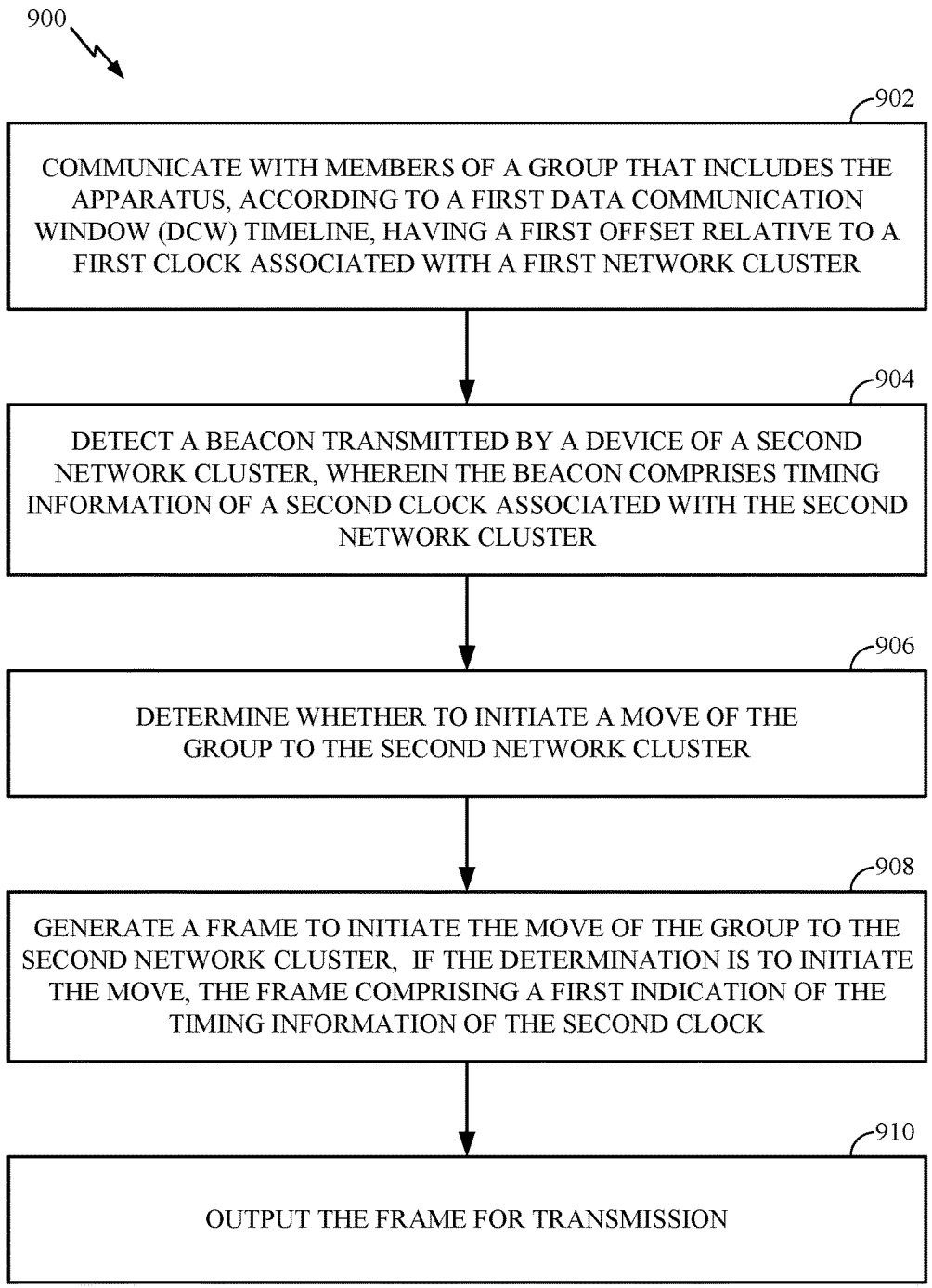
FIG. 9 illustrates a block diagram of example operations for wireless communications by an apparatus, in accordance with certain aspects of the present disclosure.

FIG. 9 illustrates example operations 900 that may be performed by an apparatus (e.g., a station) to update an NDL when moving from a first network cluster to a second network cluster as described above, according to aspects of the present disclosure.

Operations 900 begin at 902, where the apparatus communicates with one or more members of a group that includes the apparatus, according to a first data communication window (DCW) timeline (e.g., a NAN data link base schedule), having a first offset relative to a first clock associated with a first network cluster. For example and with reference to FIG. 8, an apparatus included in node 812 communicates with node 814 according to a NAN data link base schedule of the NAN data link cluster 804.

At 904, the apparatus detects a beacon associated with a second network cluster, wherein the beacon comprises timing information of a second clock associated with the second network cluster. Continuing the example above, the apparatus included in node 812 detects the anchor beacon 834, which is transmitted by node 832 and has timing information of the NAN cluster 830.

At 906, the apparatus determines whether to initiate a move of the group to the second network cluster. Continuing the example above, the apparatus included in node 812 determines to initiate a move of the NAN data link cluster 804 to NAN cluster 830.

At 908, the apparatus generates a frame to initiate the move of the group to the second network cluster, if the determination is to initiate the move, the frame comprising a first indication of the timing information of the second clock. Continuing the example above, the apparatus included in node 812 generates a frame including a beacon or cluster transition message 810, which has an indication of the timing information of the NAN cluster 830.

At 910, the apparatus outputs the frame for transmission. Continuing the example above, the apparatus included in node 812 outputs for transmission the frame including the beacon or cluster transition message 810.

According to aspects of the present disclosure, a station (e.g., a device, a node) that is a member of a first NAN cluster and participates in a NAN data link cluster may discover a second NAN cluster. The station may discover the second NAN cluster by, for example, receiving an anchor beacon transmitted by an anchor master of the second NAN cluster. Such a station may transmit a beacon or cluster transition message with information about the second cluster in the NDL base schedule (e.g., during one or more DCWs of a DCW timeline) of the NDL cluster. The information that the station includes in the beacon or cluster transition message may include a TSF of the second cluster, an anchor master rank (AMR) of the second cluster, and a time that the station is moving (e.g., transitioning) to a schedule based on the second cluster. The anchor master rank may represent a grade, to operate as an anchor master, of a device operating as an anchor master of the second cluster. As used herein, the term grade may generally refer to a credential or rank, for example, that allows a device to provide certain services including, but not limited to, operating as an anchor master. A station moving to a second NAN cluster that is participating in an NDL with another device may receive confirmation of a new NDL schedule (e.g., a data communication window timeline) from the other device in response to the beacon or cluster transition message.

According to aspects of the present disclosure, a station that is a member of a first NAN cluster, participates in a NAN data link cluster, and discovers a second NAN cluster may determine to initiate a move of the NAN data link cluster based on an anchor master rank of an anchor master of the second NAN cluster. For example and with reference to FIG. 8, node 812 may determine to join the second NAN cluster 830, if the anchor master rank of the anchor master node 832 is higher than an anchor master rank of anchor master node 806.

According to aspects of the present disclosure, a station that is a member of a first NAN cluster, participates in a NAN data link cluster, and discovers a second NAN cluster may determine to initiate a move of the NAN data link cluster based on how many times and how often the station has detected the second NAN cluster. The station may determine (e.g., based on a wireless communications standard) a threshold number of times the station should detect a beacon from the second NAN cluster before initiating a move of the NAN data link cluster to the second NAN cluster to prevent the station from initiating moves to clusters that are passing by. For example and with reference to FIG. 8, the node 812 may determine a threshold of two times of detecting a second network cluster before initiating moves to the second network cluster (e.g., the node should detect a beacon from the second network cluster twice). In the example, the node 812 may detect the anchor beacon 834 a first time and determine not to join the second NAN cluster 830, as the node has not detected the second network cluster the threshold number of times. Continuing the example, the node 812 may detect a second anchor beacon from anchor master node 832 at a later time and determine to join the second NAN cluster, as the node has detected the second network cluster the threshold number of times.

According to aspects of the present disclosure, a station that is a member of a first NAN cluster, participates in a NAN data link cluster, and discovers a second NAN cluster may determine to initiate a move of the NAN data link cluster based on services offered in the second NAN cluster. For example and with reference to FIG. 8, the node 812 may detect the anchor beacon 834, determine that a desired service (e.g., a game service) is offered in the second NAN cluster, and determine to join the second NAN cluster, because the desired service is offered in the second NAN cluster.

According to aspects of the present disclosure, a station moving from a first NAN cluster to a second NAN cluster may compute a time for the move based on estimates of how quickly other devices (e.g., devices participating in an NDL with the station) will be able to transition to a new NDL timeline (e.g., a data communication window timeline).

According to aspects of the present disclosure, a station in a first NAN cluster participating in a first NDL may use a first NDL schedule (e.g., a DCW timeline) based on a sequence (e.g., a base sequence) of DCWs beginning at the first offset relative to a discovery window associated with the first NAN cluster. The offset may be determined as a number of TUs or slots. The station may determine to move to a second NAN cluster and may determine a second NDL schedule to be used in the NDL after moving to the second NAN cluster. Such a station may determine to use a second NDL schedule that is based on the same (base) sequence of DCWs beginning at the first offset relative to a discovery window associated with the second NAN cluster.

According to aspects of the present disclosure, a station participating in an NDL and moving from a first NAN cluster to a second NAN cluster may include a time for the NDL cluster to transition to the second NAN cluster in a beacon or cluster transition message initiating a move of the NDL cluster to the second NAN cluster.

According to aspects of the present disclosure, timing information included in a beacon or cluster transition message initiating a move from a first NAN cluster to a second NAN cluster may include a timing synchronization function (TSF) value of the second NAN cluster. According to some aspects of the present disclosure, timing information included in the beacon or cluster transition message initiating the move from the first NAN cluster to the second NAN cluster may include an offset of a TSF of the second NAN cluster relative to a TSF of the first NAN cluster. When a station indicates the offset of the TSF of the second NAN cluster relative to the TSF of the first NAN cluster in the beacon or cluster transition message initiating the move to the second NAN cluster, then a device receiving the beacon or cluster transition message may use the offset of the TSF of the second NAN cluster with a clock of the device, which is synchronized with the clock of the first NAN cluster, to determine the TSF of the second NAN cluster.

According to aspects of the present disclosure, a station participating in an NDL that initiates a move from a first NAN cluster to a second NAN cluster may transmit NAN beacons in discovery windows (DWs) of the second NAN cluster. By transmitting NAN beacons, the device may enable other stations in the NDL to receive beacons of the second NAN cluster, as the other stations may not be able to receive beacons (e.g., due to channel conditions) transmitted by a master device of the second network cluster.

According to aspects of the present disclosure, a station participating in an NDL that initiates a move from a first NAN cluster to a second NAN cluster may determine times that a beacon or cluster transition message announcing the move may be transmitted and delay transmission of the beacon or cluster transition message until one of the determined times. The station may determine the times based on one or more of a property of the NDL, a property of the station, an agreement with another station reached during negotiation of the NDL, a property of the first NAN cluster, or a value supplied by an application running on the station.

Figure 10:
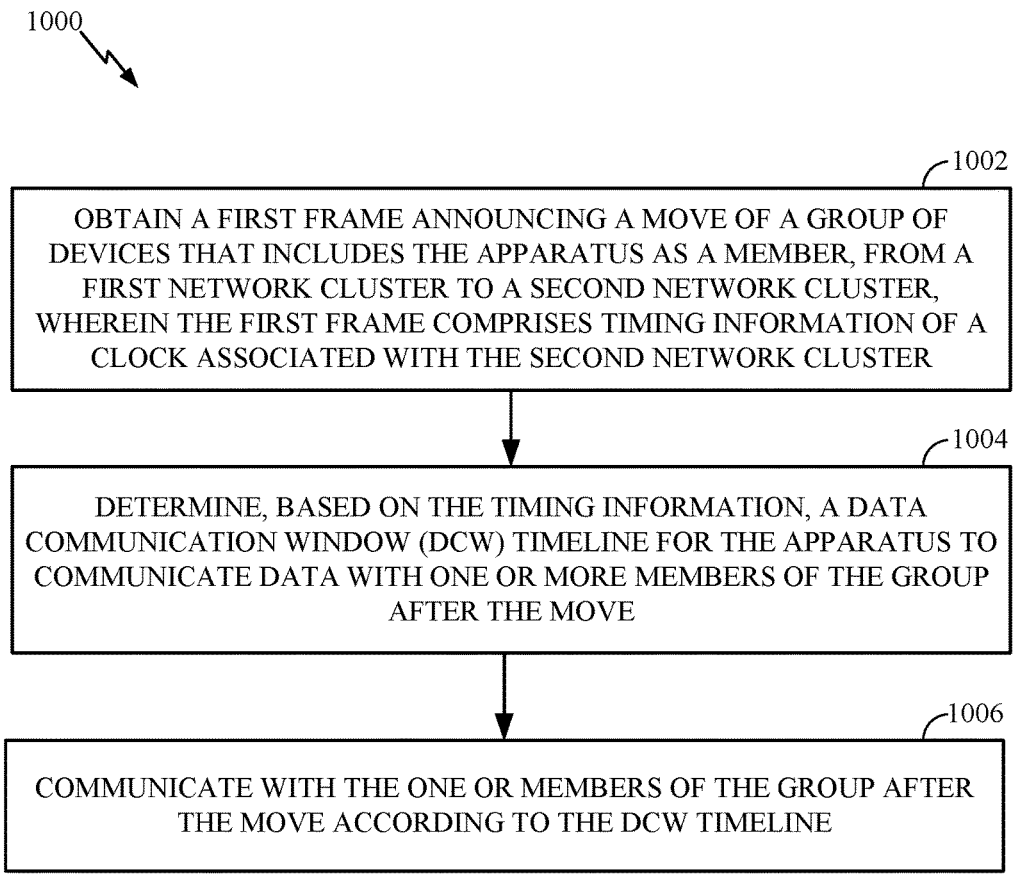
FIG. 10 illustrates a block diagram of example operations for wireless communications by an apparatus, in accordance with certain aspects of the present disclosure.

FIG. 10 illustrates example operations 1000 that may be performed by an apparatus (e.g., a station) participating in a network data link cluster, according to aspects of the present disclosure. The operations 1000 may be considered complementary to the operations 900 shown in FIG. 9, in that they may be performed by an apparatus (e.g., a STA) that is participating in an NDL with another apparatus and receives information indicating that the other apparatus is initiating a move from a first network cluster to a second network cluster.

Operations 1000 begin at 1002, where the apparatus obtains a first frame announcing a move of a group of devices that includes the apparatus as a member, from a first network cluster to a second network cluster, wherein the first frame comprises timing information of a clock associated with the second network cluster. For example and with reference to FIG. 8, node 808 obtains a frame including a beacon or cluster transition message announcing that the NDC 804 is to move to the NAN cluster 830 and including timing information of a clock of an anchor master 832 of the NAN cluster 830. In the example, the frame may have been transmitted by node 812, as illustrated in FIG. 8.

At 1004, the apparatus determines, based on the timing information, a data communication window (DCW) timeline for the apparatus to communicate data with one or more members of the group after the move. Continuing the example above, node 808 determines a DCW timeline, based on the timing information of the clock of the anchor master 832 of the NAN cluster 830, for the NDL 824.

At 1006, the apparatus communicates with the one or more members of the group after the move according to the DCW timeline. Continuing the example above, node 808 communicates with node 816 via NDL 824 using the DCW timeline determined in 1004, above.

According to aspects of the present disclosure, the apparatus may generate and transmit a second frame including timing information associated with the second network cluster. The apparatus may also obtain an anchor master rank (AMR) value, included in the first frame announcing the move, and include the AMR value in the second frame. The apparatus may also include a time at which the apparatus will move to (e.g., transition to) the second network cluster and information regarding the DCW timeline (e.g., an NDL schedule) in the second frame.

The apparatus may obtain a response to the second frame confirming the DCW timeline (e.g., an NDL schedule) from devices receiving the second frame. That is, the apparatus (e.g., node 808 in FIG. 8) may wait to move to the second network cluster (e.g., the apparatus may delay moving) and begin using the determined DCW timeline until after receiving confirmation from other devices (e.g., node 816 in FIG. 8) that the other devices will use the determined DCW timeline.

According to aspects of the present disclosure, a station participating in an NDL with a first NDL schedule (e.g., a DCW timeline) in a first NAN cluster that has obtained a frame announcing a move to a second NAN cluster may determine a second NDL schedule (e.g., a DCW timeline) for use in communicating data with other members of the NDL cluster after the move to the second NAN cluster. The first NDL schedule may be based on a sequence of DCWs beginning at the first offset relative to a discovery window associated with the first NAN cluster. According to some aspects of the present disclosure, the station may determine to move to a second NAN cluster and determine the second NDL schedule to be used in the NDL cluster after moving to the second NAN cluster. Such a station may determine to use a second NDL schedule that comprises the same base sequence of DCWs beginning at the first offset relative to a discovery window associated with the second NAN cluster.

Additionally or alternatively, a first node (e.g., node 808 shown in FIG. 8) obtaining a frame announcing a move of an NDC from a first network cluster to a second network cluster may determine, based at least on services available in the first network cluster and activity of one or more NDLs, whether to veto the move. For example, the first node may determine that the first node desires access to one or more services, which are available on nodes of the first network cluster that are not members of the NDC, more than the first node desires access to services that are provided by other members of the NDC. In the example, the first node may then determine to veto the move, stay in the first network cluster, and transmit a message to a second node (e.g., a node announcing the move) indicating that the first node will not participate in the move. In a second example, the first node may determine that an NDL has very high activity (e.g., a large amount of data is being transmitted via the NDL) and that the NDL should not be interrupted to be moved to the second network cluster. Continuing the second example, the first node may then determine to veto the move, stay in the first network cluster, and transmit a message to a second node (e.g., a node announcing the move) indicating that the first node will not participate in the move.

Figure 11:
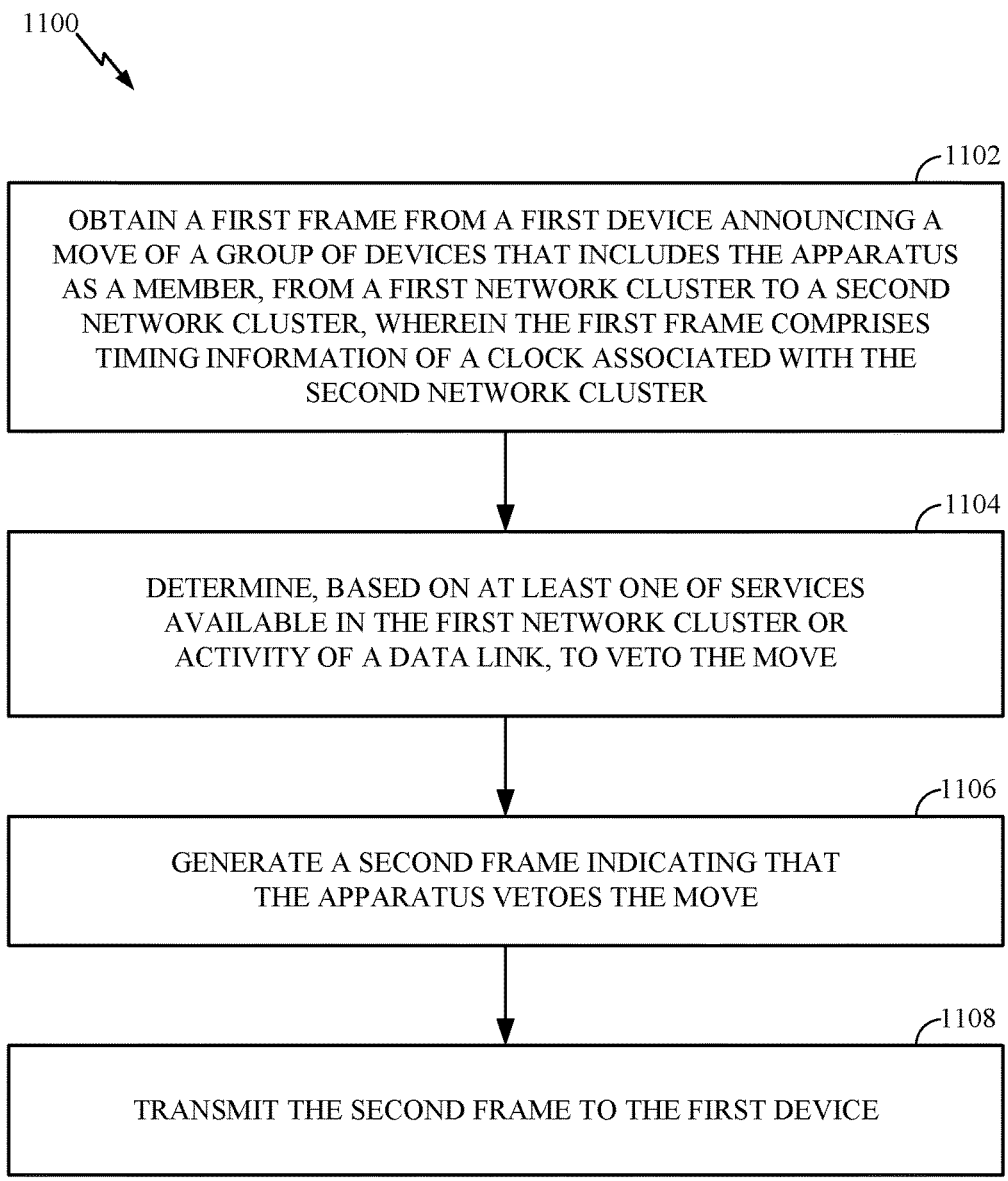
FIG. 11 illustrates a block diagram of example operations for wireless communications by an apparatus, in accordance with certain aspects of the present disclosure.

FIG. 11 illustrates example operations 1100 that may be performed by an apparatus (e.g., a station) participating in a network data link cluster, according to aspects of the present disclosure. The operations 1100 may be considered complementary to the operations 900 shown in FIG. 9, in that they may be performed by an apparatus (e.g., a STA) that is participating in an NDL with another apparatus and receives information indicating that the other apparatus is initiating a move from a first network cluster to a second network cluster.

Operations 1100 begin at 1102, where the apparatus (e.g., a node, a STA) obtains a first frame from a first device announcing a move of a group of devices that includes the apparatus as a member, from a first network cluster to a second network cluster, wherein the first frame comprises timing information of a clock associated with the second network cluster. For example and with reference to FIG. 8, node 808 obtains a frame from node 812 including a beacon or cluster transition message announcing that the NDC 804 is to move to the NAN cluster 830 and including timing information of a clock of an anchor master 832 of the NAN cluster 830.

At 1104, the apparatus determines, based on at least one of services available in the first network cluster or activity of a data link, to veto the move. Continuing the example above, node 808 determines that node 808 desires access to a service available from a node in NAN cluster 802 that is not a member of NDC 804 (e.g., node 806) more than node 808 desires access to any services provided by other members of NDC 804.

At 1106, the apparatus generates a second frame indicating that the apparatus vetoes the move. Continuing the example above, node 808 generates a second frame indicating that node 808 vetoes the move of NDC 804 to NAN cluster 830.

At 1108, the apparatus transmits the second frame to the first device. Continuing the example above, node 808 transmits the second frame to node 812.

An apparatus may be configured (e.g., programmed) to perform both of operations 1000 and 1100. For example, an apparatus may be a member of an NDC and may receive a first frame from a first node announcing a move of the NDC from a first network cluster to a second network cluster, wherein the first frame comprises timing information of a clock associated with the second network cluster. In the example, the apparatus may desire access to a service provided by a second node in the first network cluster and determine, based on services available in the first network cluster, to veto the move and may transmit a second frame to the first node indicating that the apparatus vetoes the move. Continuing the example, the apparatus may later receive a third frame from the first node announcing a move of the NDC from the first cluster to a third network cluster, wherein the third frame comprises timing information of a clock associated with the third network cluster. In the example, the apparatus may no longer desire access to the service provided by the second node and may determine not to veto the move. Still in the example, the apparatus may determine, based on the timing information of the third network cluster, a DCW timeline for the apparatus to communicate data with one or members of the group after the move. In the example, the apparatus may communicate with the one or members of the group after the move according to the DCW timeline.

A first node that is in a first network cluster and has announced a move of a group of network devices from the first network cluster to a second network cluster may obtain a frame from a second node that is a member of the group indicating that the second node vetoes the move of the group to the second network cluster. According to aspects of the present disclosure, the first node may then determine whether to move to the second network cluster and possibly leave the group or to cancel the move to the second network cluster. For example and with reference to FIG. 8, node 812 may announce a move of NDC 804 to NAN cluster 830. Node 814 may transmit a frame indicating that node 814 vetoes the move to NAN cluster 830. Upon obtaining the frame, node 812 may determine whether to move to NAN cluster 830 and possibly leave NDC 804 (and possibly break NDL 822), or to cancel the move of NDC 804 to NAN cluster 830.

Figure 12:
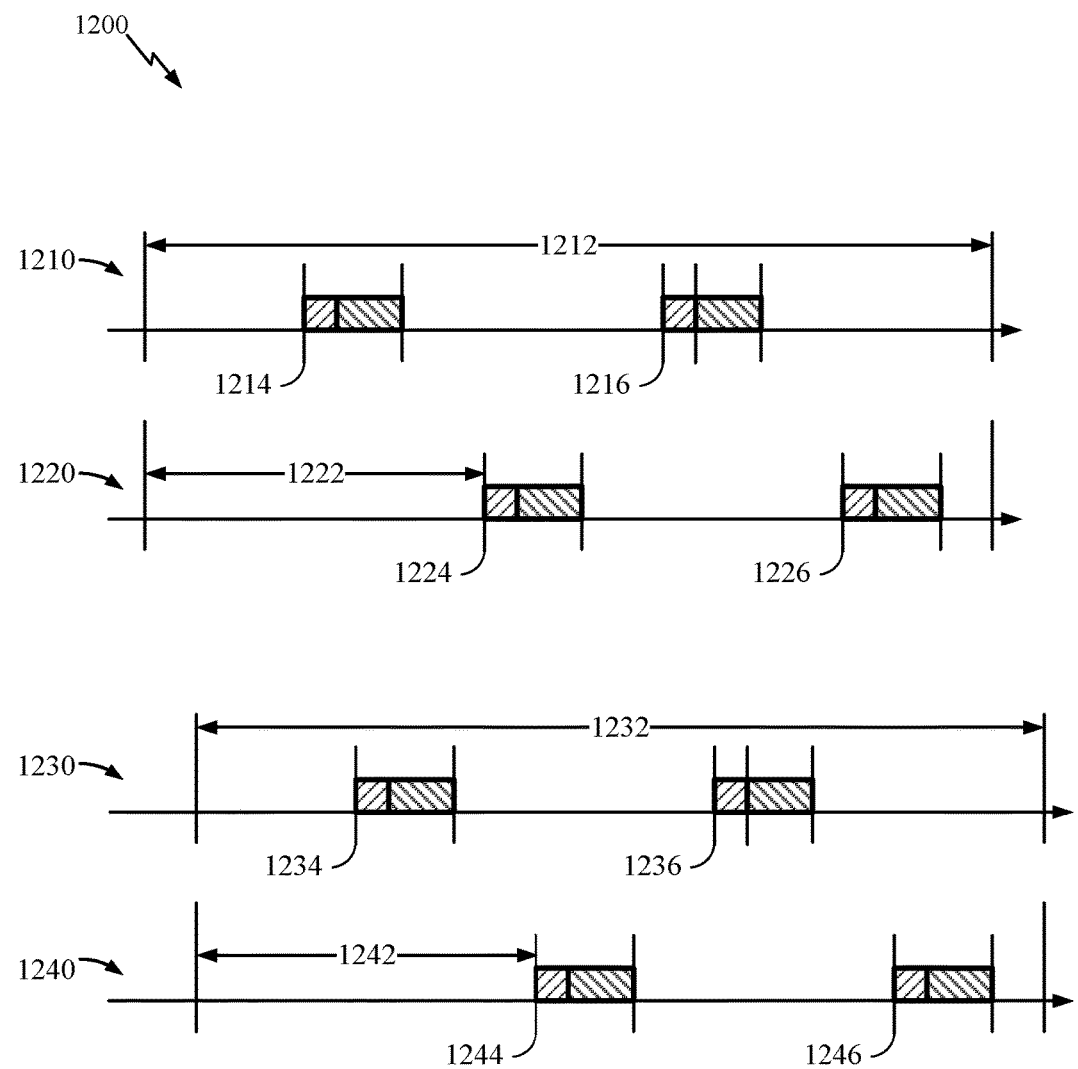
FIG. 12 illustrates a set of example communications timelines, in accordance with aspects of the present disclosure.

FIG. 12 illustrates a set 1200 of example communications timelines 1210, 1220, 1230, 1240 within a first NAN cluster (e.g., NAN cluster 802 shown in FIG. 8), a second NAN cluster (e.g., NAN cluster 830 shown in FIG. 8), and an NDL cluster (e.g., NDC 804, shown in FIG. 8), in accordance with aspects of the present disclosure. The first NAN cluster has a NAN discovery channel that is operated according to the exemplary timeline 1210, with a NAN discovery window shown at 1212 and NAN beacons at 1214 and 1216. The second NAN cluster has a NAN discovery channel that is operated according to the exemplary timeline 1230, with a NAN discovery window shown at 1232 and NAN beacons at 1234 and 1236. The NDL cluster operates on a channel according to an NDL schedule shown on the exemplary timeline 1220. The NDL schedule comprises two DCWs 1224, 1226. As illustrated, the DCWs begin an NDL offset 1222 after the beginning of the NAN discovery window 1212. Later, a member (e.g., node 812, shown in FIG. 8) of the NDL cluster detects a beacon from the second NAN cluster and determines to move to the second NAN cluster. As described above, the member may determine to use an NDL schedule 1240 with the same base sequence of DCWs 1244, 1246 at an offset 1242 relative to a discovery window 1232 associated with the second NAN cluster. Note that the offset 1242 relative to the discovery window 1232 is of a same length as the offset 1222 relative to the discovery window 1212.

According to aspects of the present disclosure, a station participating in an NDL with a first NDL schedule in a first NAN cluster that has initiated a move to a second NAN cluster may determine a second NDL schedule (e.g., a DCW timeline) for use in communicating data with other members of the NDL cluster after the move to the second NAN cluster. The first NDL schedule may have a first offset relative to a first clock associated with the first NAN cluster. According to some aspects of the present disclosure, the station may determine the second NDL schedule such that the second NDL schedule has a second offset relative to a second clock associated with the second NAN cluster, and set the second offset equal to the first offset, as illustrated in FIG. 12.

When a NAN Data Link (NDL) cluster is initialized, an NDL timeline may be determined based on the discovery window timeline of the originating cluster (e.g., the originating NAN cluster). Once the NDL cluster is initialized, the NDL cluster may maintain a timeline that is independent of a discovery window timeline. According to aspects of the present disclosure, the NDL timeline may not shift, even as the originating NAN cluster changes.

Figure 13:
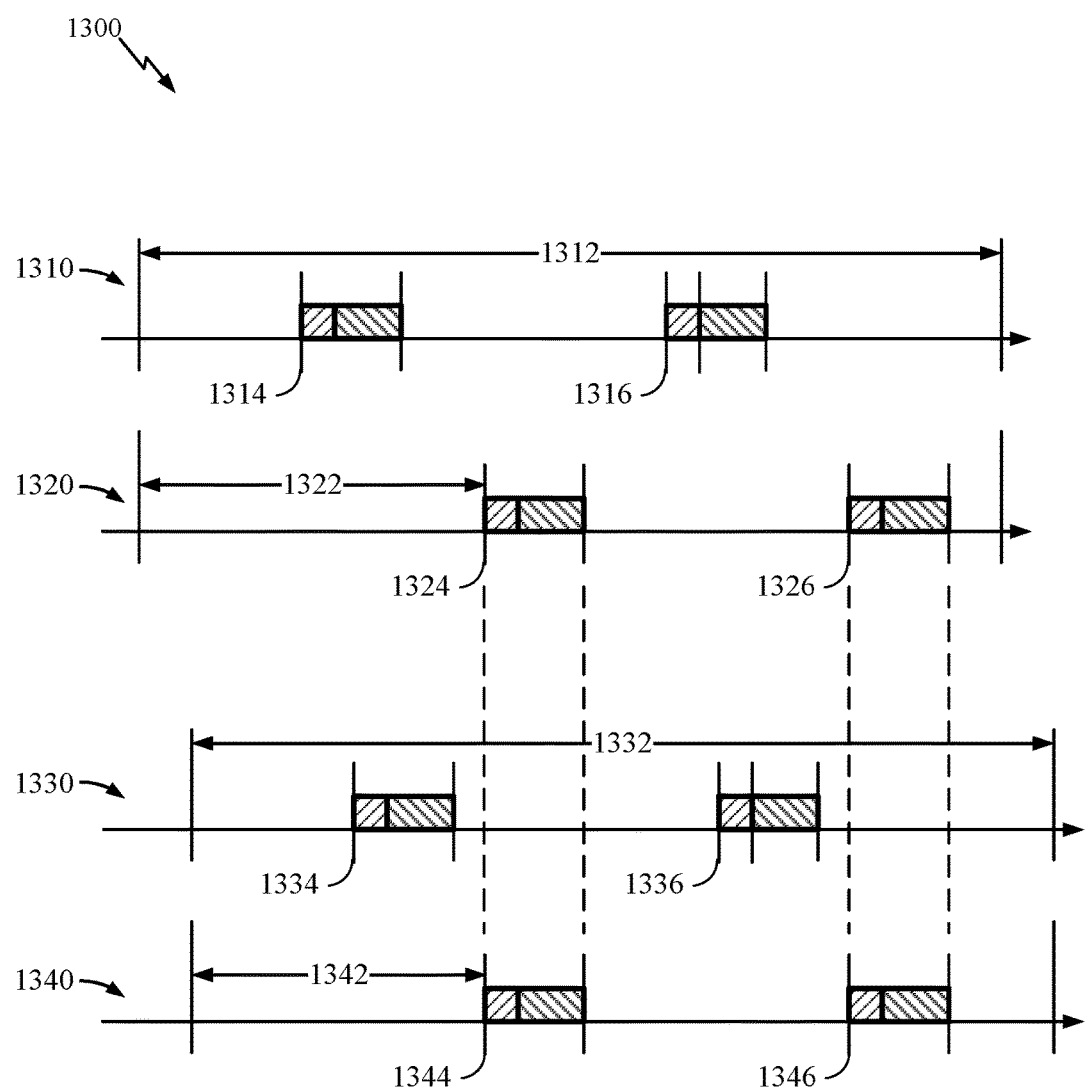
FIG. 13 illustrates a set of example communications timelines, in accordance with aspects of the present disclosure.

FIG. 13 illustrates a set 1300 of example communications timelines 1310, 1320, 1330, 1340 within a first NAN cluster (e.g., NAN cluster 802 shown in FIG. 8), a second NAN cluster (e.g., NAN cluster 830 shown in FIG. 8), and an NDL cluster (e.g., NDC 804, shown in FIG. 8), in accordance with aspects of the present disclosure. As above, the first NAN cluster has an exemplary NAN discovery channel timeline 1310, with a NAN discovery window shown at 1312 and NAN beacons at 1314 and 1316. Also as above, the second NAN cluster has an exemplary NAN discovery channel timeline 1330, with a NAN discovery window shown at 1332 and NAN beacons at 1334 and 1336. The NDL cluster operates on a channel according to an NDL schedule comprising DCWs 1324, 1326, as shown on the exemplary timeline 1320. As above, the DCWs begin an NDL offset 1322 after the beginning of the NAN discovery window. As described above, the NDL cluster may maintain an NDL timeline that is independent of a discovery window timeline. Thus, when a member (e.g., node 812, shown in FIG. 8) of the NDL cluster later detects a beacon from the second NAN cluster and determines to move to the second NAN cluster, the NDL cluster may use an NDL schedule 1340 with the same base sequence of DCWs 1344, 1346 occurring at the same absolute times (as illustrated by the dashed lines) as the DCWs would occur on the exemplary timeline 1320, despite that the sequence of DCWs is at an offset 1342 relative to the discovery window 1332 of the second NAN cluster that is different from the offset 1322 to the discovery window 1312 of the first NAN cluster.

According to aspects of the present disclosure, a station may be a member of a first NAN cluster and may be participating in an NDL with an NDL schedule that has a first offset from a NAN discovery window of the first NAN cluster, according to a first clock associated with the first NAN cluster. The station may initiate a move to a second NAN cluster, as described above. The station may calculate a second offset, relative to a NAN discovery window of the second NAN cluster, of the NDL schedule. The station may calculate the second offset such that the NDL schedule remains unchanged relative to the DCWs of the NDL schedule before the station moved to the second NAN cluster, as illustrated in FIG. 13.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

Figure 9A:
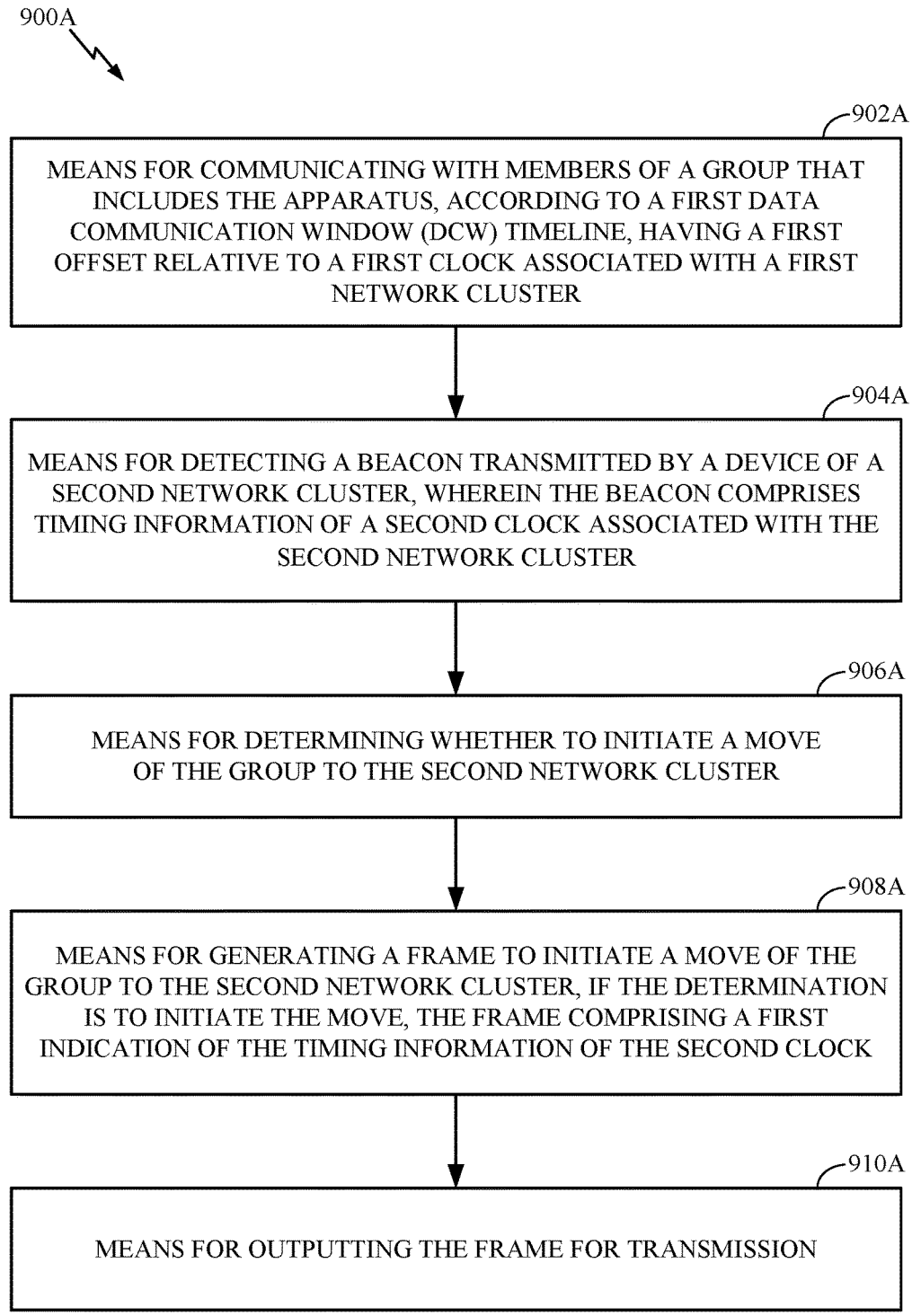
FIG. 9A illustrates example means capable of performing the operations shown in FIG. 9.
Figure 10A:
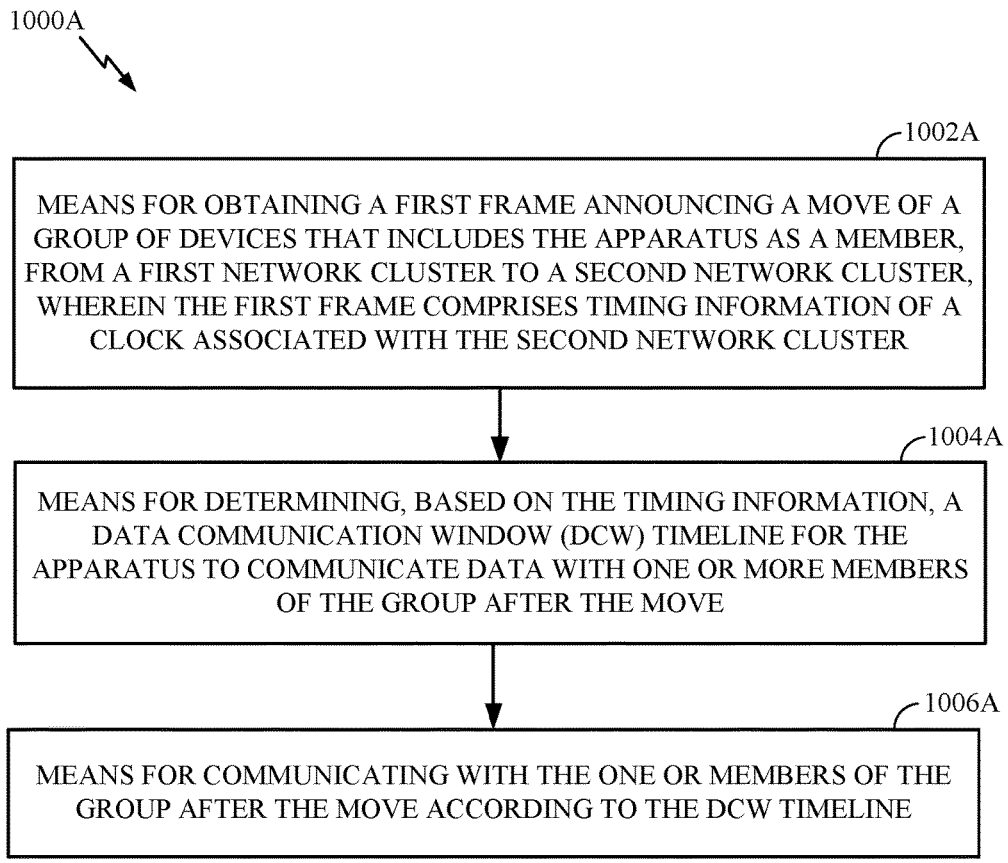
FIG. 10A illustrates example means capable of performing the operations shown in FIG. 10.
Figure 11A:
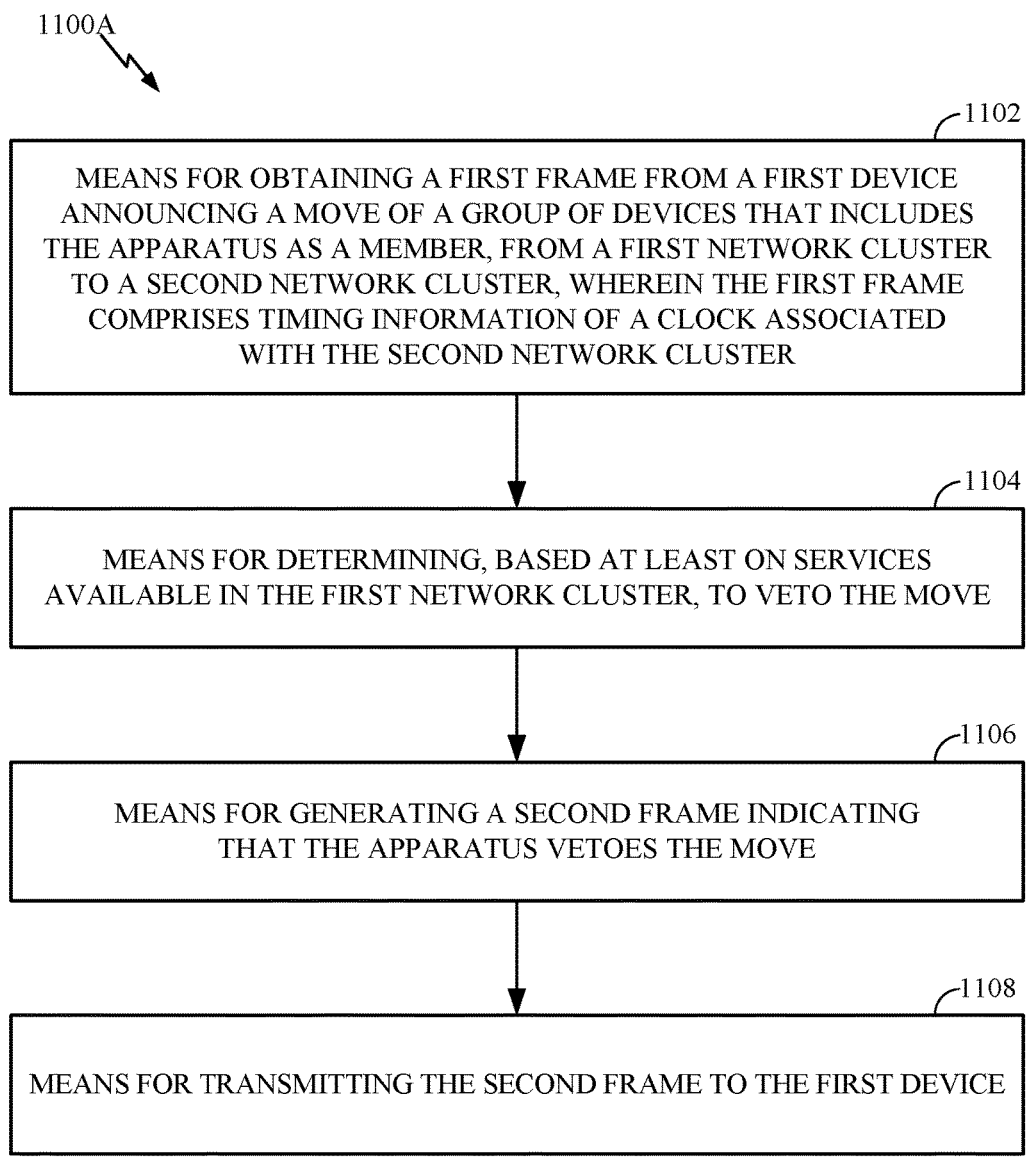
FIG. 11A illustrates example means capable of performing the operations shown in FIG. 11.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 900 illustrated in FIG. 9 correspond to means 900A illustrated in FIG. 9A, operations 1000 illustrated in FIG. 10 correspond to means 1000A illustrated in FIG. 10A, and operations 1100 illustrated in FIG. 11 correspond to means 1100A illustrated in FIG. 11A.

For example, means for receiving, means for obtaining, and means for communicating may be a receiver (e.g., the receiver unit of transceiver 254) and/or an antenna(s) 252 of the user terminal 120 illustrated in FIG. 2, the receiver (e.g., the receiver unit of transceiver 222) and/or antenna(s) 224 of access point 110 illustrated in FIG. 2, or the receiver 312, antennas 316, and/or the bus system 322 illustrated in FIG. 3. Means for transmitting and means for outputting may be a transmitter (e.g., the transmitter unit of transceiver 254) and/or an antenna(s) 252 of the user terminal 120 illustrated in FIG. 2, the transmitter (e.g., the transmitter unit of transceiver 222) and/or antenna(s) 224 of access point 110 illustrated in FIG. 2, or the transmitter 310, antennas 316, and/or the bus system 322 illustrated in FIG. 3.

Means for placing, means for generating, means for including, means for determining, means for exiting, means for maintaining, means for setting, means for delaying, means for waiting, and means for updating may comprise a processing system, which may include one or more processors, such as the RX data processor 270, the TX data processor 288, and/or the controller 280 of the user terminal 120 illustrated in FIG. 2 or the TX data processor 210, RX data processor 242, and/or the controller 230 of the access point 110 illustrated in FIG. 2.

According to certain aspects, such means may be implemented by processing systems configured to perform the corresponding functions by implementing various algorithms (e.g., in hardware or by executing software instructions) described above. For example, an algorithm for determining a data communication window (DCW) timeline for communicating data between a group of devices including the apparatus, and algorithm for maintaining a local clock for the DCW timeline, and an algorithm for updating the local clock based on at least one of a relative drift between the local clock and the clock associated with the first network cluster, or a move of the apparatus from the first network cluster to a second network cluster, may be implemented by processing systems configured to perform the above functions.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining occurrence of a first type of discovery window for a network that occurs according to a first interval, instructions for determining occurrence of a second type of discovery window for the that occurs according to a second interval shorter than the first interval, instructions for obtaining, from at least one other apparatus associated with the network, at least one of time synchronization information or service information during at least one of the first type of discovery window or the second type of discovery window, and instructions for outputting, for transmission in the network, at least one of the time synchronization information or the service information during at least one of the first type of discovery window or the second type of discovery window.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    an interface configured to obtain a first frame announcing a move of a group of devices that includes the apparatus, from a first network cluster to a second network cluster, wherein the first frame comprises timing information of a clock associated with the second network cluster; and
    a processing system configured to:
        determine, based on the timing information, an offset associated with a data communication window (DCW) timeline, wherein the DCW timeline is associated with the second network cluster, and
        determine, based on the offset the DCW timeline for the apparatus to communicate data with one or more members of the group after the move;

wherein the interface is configured to communicate with the one or more members of the group after the move according to the DCW timeline.

2. The apparatus of claim 1, wherein:
the processing system is configured to generate a second frame announcing the move, the second frame comprising the timing information of the clock associated with the second network cluster, and
the interface is configured to output the second frame for transmission.

3. The apparatus of claim 1, wherein:
the processing system is configured to generate a second frame announcing the move, the second frame comprising information regarding the DCW timeline, and
the interface is configured to output the second frame for transmission.

4. The apparatus of claim 3, wherein:
the interface is further configured to:
    obtain a response to the second frame confirming the DCW timeline, and
    communicate with the one or more members of the group according to the DCW timeline after the response is obtained.

5. The apparatus of claim 1, wherein:
the processing system is further configured to determine another offset, relative to a discovery window (DW) associated with the first network cluster, of another DCW timeline used prior to the move; and
the processing system is configured to determine the DCW timeline based on the other DCW timeline and the other offset.

6. The apparatus of claim 1, wherein:
another DCW timeline used prior to the move is based on a sequence of DCWs and another offset; and
the processing system is configured to determine the DCW timeline based on the sequence and the offset.

7. A method for wireless communications by an apparatus, comprising:
    obtaining a first frame announcing a move of a group of devices that includes the apparatus, from a first network cluster to a second network cluster, wherein the first frame comprises timing information of a clock associated with the second network cluster;
    determining, based on the timing information, an offset associated with a data communication window (DCW) timeline, wherein the DCW timeline is associated with the second network cluster,
    determining, based on the offset the DCW timeline for the apparatus to communicate data with one or more members of the group after the move; and
    communicating with the one or more members of the group after the move according to the DCW timeline.

8. The method of claim 7, further comprising:
generating a second frame announcing the move, the second frame comprising the timing information of the clock associated with the second network cluster, and
outputting the second frame for transmission.

9. The method of claim 7, further comprising:
generating a second frame announcing the move, the second frame comprising information regarding the DCW timeline, and
outputting the second frame for transmission.

10. The method of claim 9, further comprising:
obtaining a response to the second frame confirming the DCW timeline; and
communicating with the one or more members of the group according to the DCW timeline after the response is obtained.

11. The method of claim 7, further comprising:
determining a first offset, relative to discovery window (DW) associated with the first network cluster, of another DCW timeline used prior to the move; and
determining the DCW timeline based on the other DCW timeline and the other offset.

12. The method of claim 7, wherein:
another DCW timeline used prior to the move is based on a sequence of DCWs and another offset; and
the method further comprises determining the DCW timeline based on the sequence and the offset.

13. A wireless station, comprising:
a transceiver configured to receive a first frame announcing a move of a group of devices that includes the wireless station, from a first network cluster to a second network cluster, wherein the first frame comprises timing information of a clock associated with the second network cluster; and
a processing system configured to:
determine, based on the timing information, an offset associated with a data communication window (DCW) timeline, wherein the DCW timeline is associated with the second network cluster, and
determine, based on the offset the DCW timeline for the wireless station to communicate data with one or more members of the group after the move;
wherein the transceiver is configured to communicate with the one or more members of the group after the move according to the DCW timeline.

* * * * *